US012694106B2

(12) United States Patent
Hammerle et al.

(10) Patent No.: US 12,694,106 B2
(45) Date of Patent: **\*Jul. 28, 2026**

(54) INCIDENT DRIVEN AUTOMATED INVESTIGATION

(71) Applicant: Dropzone.ai, Inc., Seattle, WA (US)

(72) Inventors: Eric Joseph Hammerle, Kirkland, WA (US); Xue Jun Wu, Seattle, WA (US); Colin James Phillips, Kirkland, WA (US); Alexander Gearhart Burner, Seattle, WA (US); Brian David Hatch, Seattle, WA (US); Tien-jui Lee, Seattle, WA (US)

(73) Assignee: Dropzone.ai, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/978,990

(22) Filed: Dec. 12, 2024

(65) Prior Publication Data

US 2026/0170127 A1      Jun. 18, 2026

(51) Int. Cl.
G06F 21/55 (2013.01)

(52) U.S. Cl.
CPC ...... G06F 21/554 (2013.01); G06F 2221/034 (2013.01)

(58) Field of Classification Search
CPC ........................ G06F 21/554; G06F 2221/034
USPC .......................................................... 726/23
See application file for complete search history.

(56) References Cited

U.S. PATENT DOCUMENTS

| | | | |
|---|---|---|---|
| 7,330,817 B1 * | 2/2008 | Exall ...................... | G06Q 10/00 |
| | | | 705/321 |
| 9,363,149 B1 | 6/2016 | Chauhan et al. | |
| 9,600,659 B1 * | 3/2017 | Bird ........................ | G06F 21/50 |
| 10,198,433 B2 | 2/2019 | Weston et al. | |
| 10,666,666 B1 * | 5/2020 | Saurabh .............. | H04L 63/1425 |
| 10,694,026 B2 * | 6/2020 | Chandrasekaran .... | G06N 20/10 |

(Continued)

FOREIGN PATENT DOCUMENTS

| | | |
|---|---|---|
| CN | 115981240 B | 6/2023 |
| WO | 2025/029346 A1 | 2/2025 |

OTHER PUBLICATIONS

Office Communication for U.S. Appl. No. 18/753,778 mailed Dec. 30, 2024, 10 Pages.

(Continued)

*Primary Examiner* — Pramila Parthasarathy
(74) *Attorney, Agent, or Firm* — John W. Branch; Branch Partners PLLC

(57)          ABSTRACT

Embodiments monitor security environments. An assessment of events may be used to generate event data that includes findings associated with events. The event data may be employed to: determine users associated with an event based on a discovery agent provided a discovery prompt; determine findings that may be eligible for an interview based on a subject agent provided a subject prompt; employ the subject agent to generate questions based on the eligible findings such that each question requests additional information associated with the eligible findings; collecting the additional information for the eligible findings based on a questioner agent provided a questioner prompt to perform an interview. An updated assessment may be employed to display a report for security administrators.

26 Claims, 16 Drawing Sheets

(56) References Cited

U.S. PATENT DOCUMENTS

| | | | |
|---|---|---|---|
| 11,916,767 | B1 | 2/2024 | Wu et al. |
| 11,943,387 | B1* | 3/2024 | Wolinsky ............ H04M 3/2281 |
| 11,960,515 | B1 | 4/2024 | Pallakonda et al. |
| 12,008,332 | B1 | 6/2024 | Gardner et al. |
| 12,034,616 | B1 | 7/2024 | Wu et al. |
| 12,105,746 | B1* | 10/2024 | Wu ......................... H04L 63/20 |
| 12,229,313 | B1* | 2/2025 | Shastry .................. G06V 20/41 |
| 12,248,501 | B1 | 3/2025 | Wu et al. |
| 12,537,750 | B2 | 1/2026 | Wu et al. |
| 2003/0093276 | A1 | 5/2003 | Miller et al. |
| 2013/0343205 | A1* | 12/2013 | Dolan ................... H04M 3/436 370/250 |
| 2015/0347569 | A1* | 12/2015 | Allen ............... G06F 16/24578 707/728 |
| 2016/0171068 | A1 | 6/2016 | Hardin |
| 2016/0342317 | A1* | 11/2016 | Lim .................... G10L 15/1822 |
| 2017/0034023 | A1 | 2/2017 | Nickolov et al. |
| 2018/0240043 | A1 | 8/2018 | Majumdar et al. |
| 2019/0138879 | A1* | 5/2019 | Hu ........................... G06N 5/01 |
| 2020/0184072 | A1 | 6/2020 | Ikeda |
| 2020/0387816 | A1* | 12/2020 | Rodriguez Bravo .... G09B 7/00 |
| 2021/0174095 | A1 | 6/2021 | Kong et al. |
| 2021/0232994 | A1 | 7/2021 | Rhodes et al. |
| 2022/0263858 | A1 | 8/2022 | Bargnesi et al. |
| 2022/0263860 | A1 | 8/2022 | Crabtree et al. |
| 2022/0295008 | A1 | 9/2022 | Nold et al. |
| 2022/0391595 | A1 | 12/2022 | Shevelev et al. |
| 2023/0208971 | A1 | 6/2023 | Te Booij et al. |
| 2023/0244869 | A1 | 8/2023 | Neumann |
| 2023/0359789 | A1 | 11/2023 | Andre et al. |
| 2024/0045990 | A1* | 2/2024 | Boyer ................. G06F 21/6245 |
| 2024/0054233 | A1 | 2/2024 | Ohayon et al. |
| 2024/0070251 | A1* | 2/2024 | Maizels .................. G10L 13/02 |
| 2024/0098105 | A1 | 3/2024 | Kanady et al. |
| 2024/0134865 | A1* | 4/2024 | Bierner ................... G06F 40/30 |
| 2024/0256548 | A1 | 8/2024 | Hermanek et al. |
| 2024/0260892 | A1* | 8/2024 | Haas ..................... A61B 5/4824 |
| 2024/0281472 | A1 | 8/2024 | Larhette et al. |
| 2024/0291779 | A1 | 8/2024 | Catalano et al. |
| 2024/0291835 | A1 | 8/2024 | Sethi et al. |
| 2024/0291853 | A1 | 8/2024 | Murphy et al. |
| 2024/0323152 | A1 | 9/2024 | Rosenberg et al. |
| 2024/0355337 | A1* | 10/2024 | Altaf ...................... G10L 15/02 |
| 2024/0363099 | A1* | 10/2024 | Altaf ...................... G10L 15/02 |
| 2024/0363103 | A1* | 10/2024 | Altaf ...................... G10L 15/08 |
| 2024/0393750 | A1* | 11/2024 | Malladi ............. G05B 13/0265 |
| 2024/0402664 | A1 | 12/2024 | Sudhakar et al. |
| 2024/0403416 | A1* | 12/2024 | Sharpe .................. G06F 16/243 |
| 2024/0403634 | A1* | 12/2024 | Hawes ..................... G06N 3/08 |
| 2024/0411994 | A1 | 12/2024 | Siracusano et al. |
| 2024/0412031 | A1 | 12/2024 | Rayman |
| 2024/0412839 | A1* | 12/2024 | Tang ...................... G16H 20/30 |
| 2024/0414211 | A1 | 12/2024 | Boyer et al. |
| 2025/0037107 | A1* | 1/2025 | Abdelrahman ....... G10L 15/183 |
| 2025/0047578 | A1 | 2/2025 | Wu et al. |
| 2025/0053273 | A1* | 2/2025 | Uva .................. G06Q 30/0282 |
| 2025/0209156 | A1 | 6/2025 | Sankaran et al. |
| 2025/0217480 | A1 | 7/2025 | Trigano et al. |
| 2025/0342184 | A1 | 11/2025 | Wu et al. |
| 2025/0370966 | A1 | 12/2025 | Wagener-Kirchner et al. |

OTHER PUBLICATIONS

Office Communication for U.S. Appl. No. 18/230,123 mailed Sep. 25, 2023, 9 Pages.

Office Communication for U.S. Appl. No. 18/230,123 mailed Dec. 12, 2023, 22 Pages.

Office Communication for U.S. Appl. No. 18/587,712 mailed May 14, 2024, 14 Pages.

Office Communication for U.S. Appl. No. 18/652,093 mailed Jul. 31, 2024, 21 Pages.

Office Communication for U.S. Appl. No. 18/753,778 mailed Sep. 5, 2024, 16 Pages.

International Search Report and Written Opinion for International Patent Application No. PCT/US2024/028612 mailed Aug. 6, 2024, 14 Pages.

Sreake Division, "Achieving operational efficiency in Kubernetes with ChatGPT-4: Troubleshooting", Three Shakes Inc., Blog; May 23, 2023, 57 pages.

Fixpoint Inc., "Decision to release fault notification service using LLM", PR Times, Jul. 18, 2023, 4 pages.

Office Communication for U.S. Appl. No. 18/902,566 mailed Dec. 6, 2024, 21 Pages.

Office Communication for U.S. Appl. No. 18/753,778 mailed Mar. 20, 2025, 4 Pages.

Office Communication for U.S. Appl. No. 18/753,778 mailed Apr. 23, 2025, 11 Pages.

Office Communication for U.S. Appl. No. 18/753,778 mailed Sep. 18, 2025, 10 Pages.

Office Communication for U.S. Appl. No. 19/296,689 mailed Oct. 24, 2025, 10 Pages.

Office Communication for U.S. Appl. No. 19/296,653 mailed Nov. 3, 2025, 9 Pages.

Office Communication for U.S. Appl. No. 19/296,653 mailed Nov. 14, 2025, 2 Pages.

Office Communication for U.S. Appl. No. 18/753,778 mailed Dec. 16, 2025, 7 Pages.

Office Communication for U.S. Appl. No. 19/394,206 mailed Jan. 7, 2026, 6 Pages.

Office Communication for U.S. Appl. No. 19/402,834 mailed Feb. 20, 2026, 19 Pages.

Office Communication for U.S. Appl. No. 19/394,206 mailed Mar. 2, 2026, 5 Pages.

* cited by examiner

Figure 3:
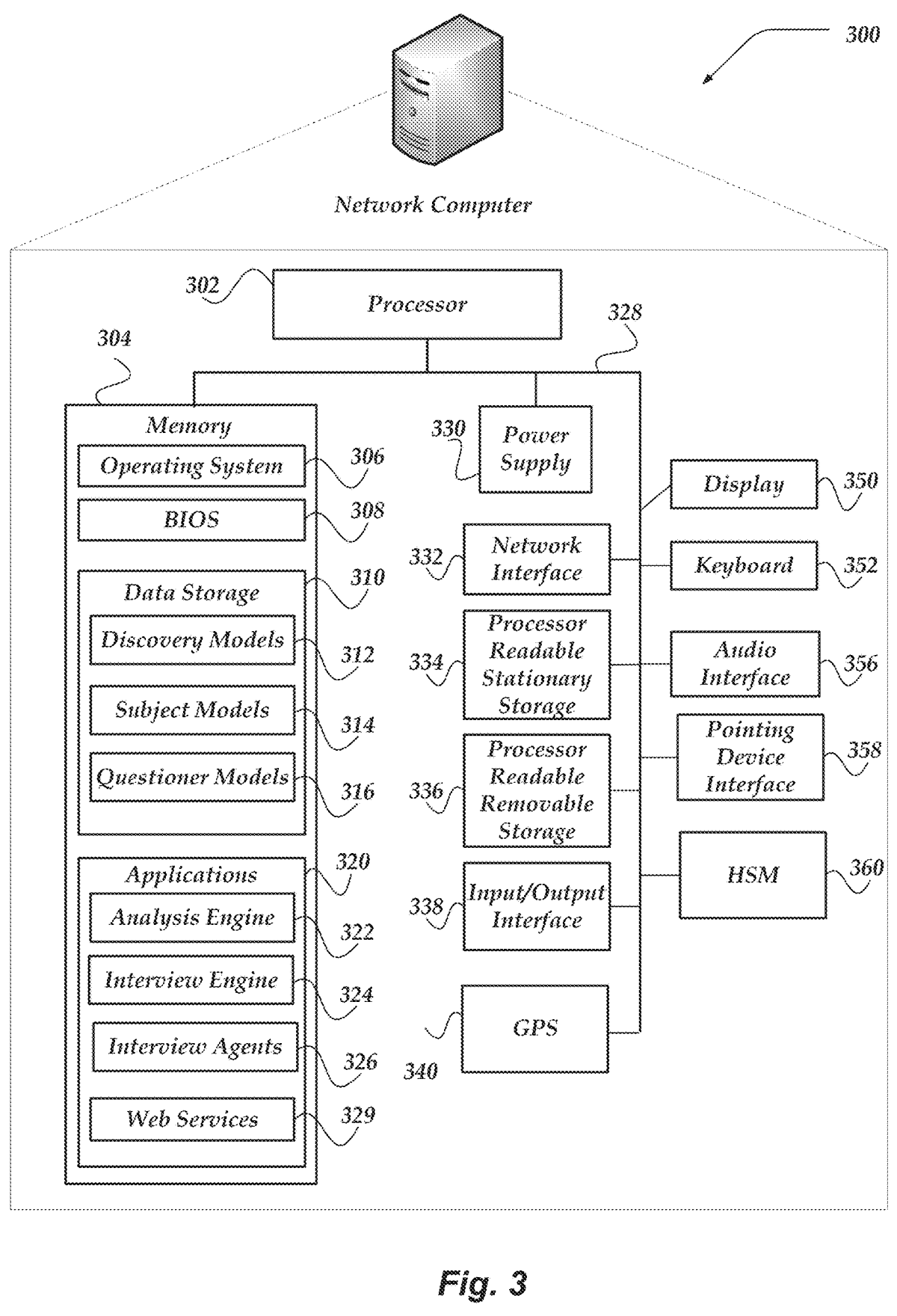

*300*

*Network Computer*

302 *Processor*

328

304 Memory

306 Operating System

308 BIOS

310 Data Storage

312 Discovery Models

314 Subject Models

316 Questioner Models

320 Applications

322 Analysis Engine

324 Interview Engine

326 Interview Agents

329 Web Services

330 Power Supply

332 Network Interface

334 Processor Readable Stationary Storage

336 Processor Readable Removable Storage

338 Input/Output Interface

340 GPS

350 Display

352 Keyboard

356 Audio Interface

358 Pointing Device Interface

360 HSM

| Field Name | Value |
|---|---|
| ID | 12324 |
| Raw Body | [...] |
| Summary | [...] |
| Type | [...] |
| Priority | [...] |
| Timestamp | T202403010011 |
| Metrics | [...] |
| Associated Users | [...] |
| Findings | [...] |
| ... | [...] |

706 →
708 →
710 →
712 →
714 →
718 →
720 →
722 →
724 →
726 →

_800_
_802_
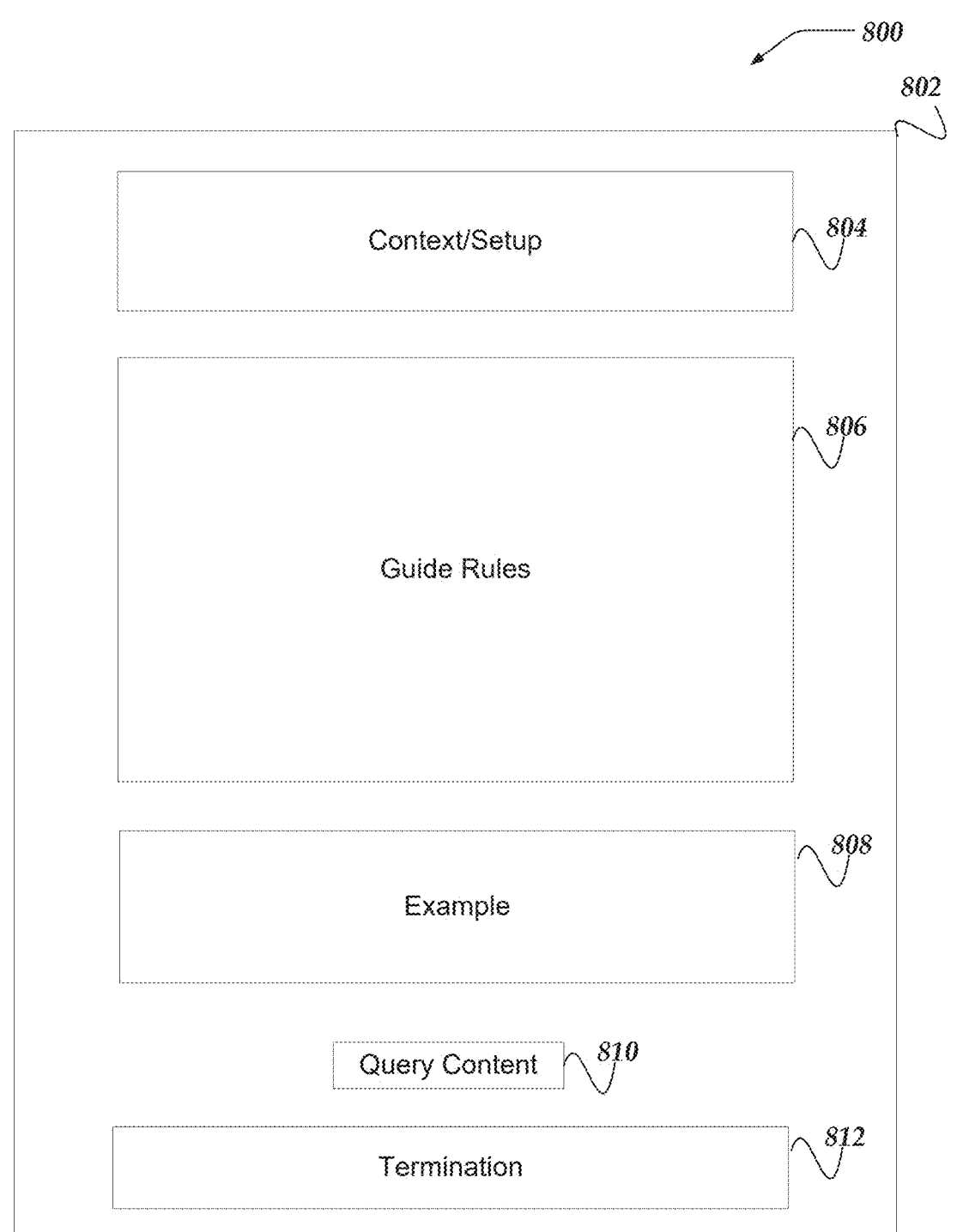
Context/Setup    _804_
Guide Rules    _806_
Example    _808_
Query Content    _810_
Termination    _812_
_Fig. 8_

Figure 9:
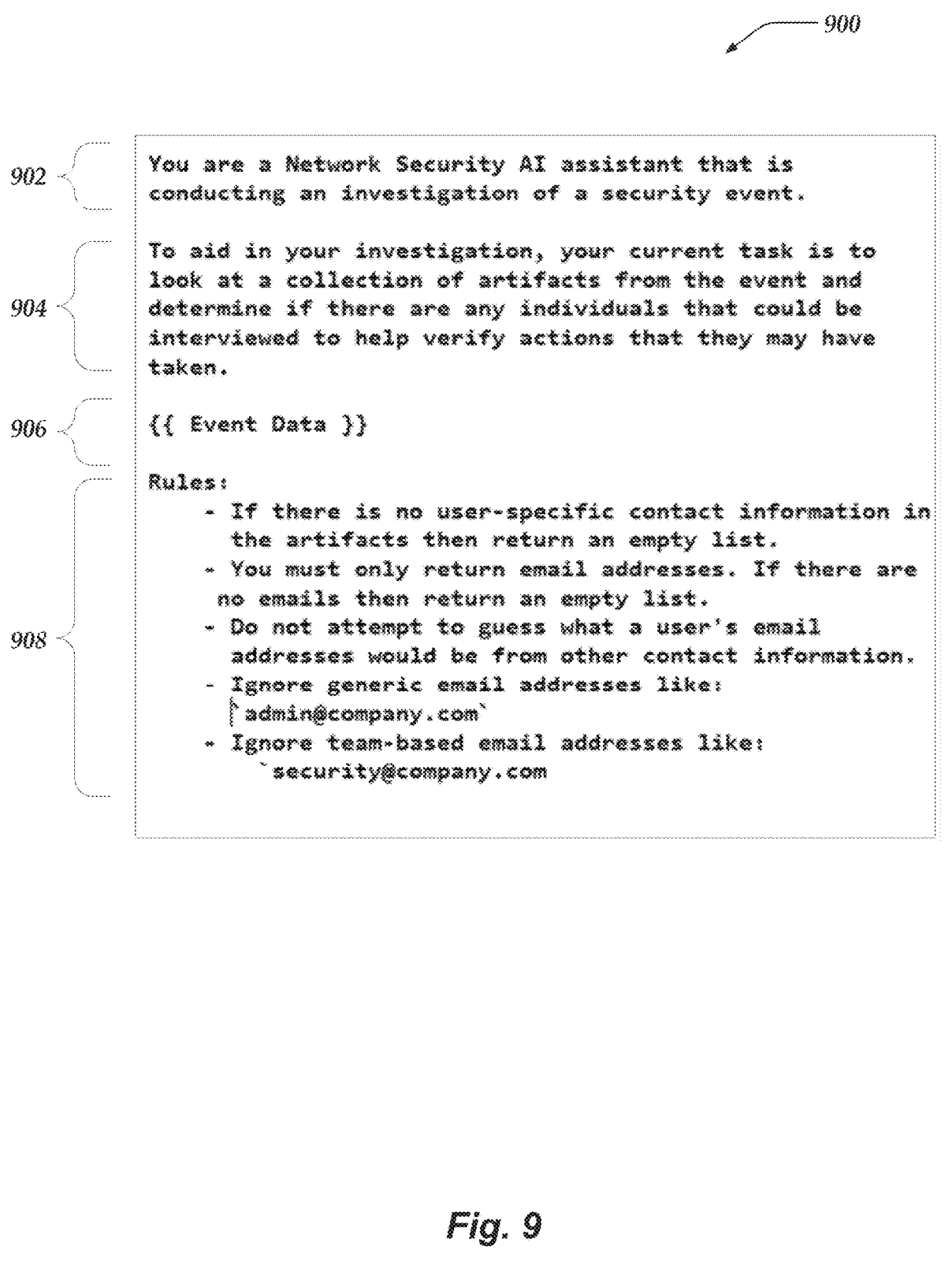

900

902 — You are a Network Security AI assistant that is conducting an investigation of a security event.

904 — To aid in your investigation, your current task is to look at a collection of artifacts from the event and determine if there are any individuals that could be interviewed to help verify actions that they may have taken.

906 — {{ Event Data }}

908 —
Rules:
- If there is no user-specific contact information in the artifacts then return an empty list.
- You must only return email addresses. If there are no emails then return an empty list.
- Do not attempt to guess what a user's email addresses would be from other contact information.
- Ignore generic email addresses like:
  `admin@company.com`
- Ignore team-based email addresses like:
  `security@company.com

Figure 10:
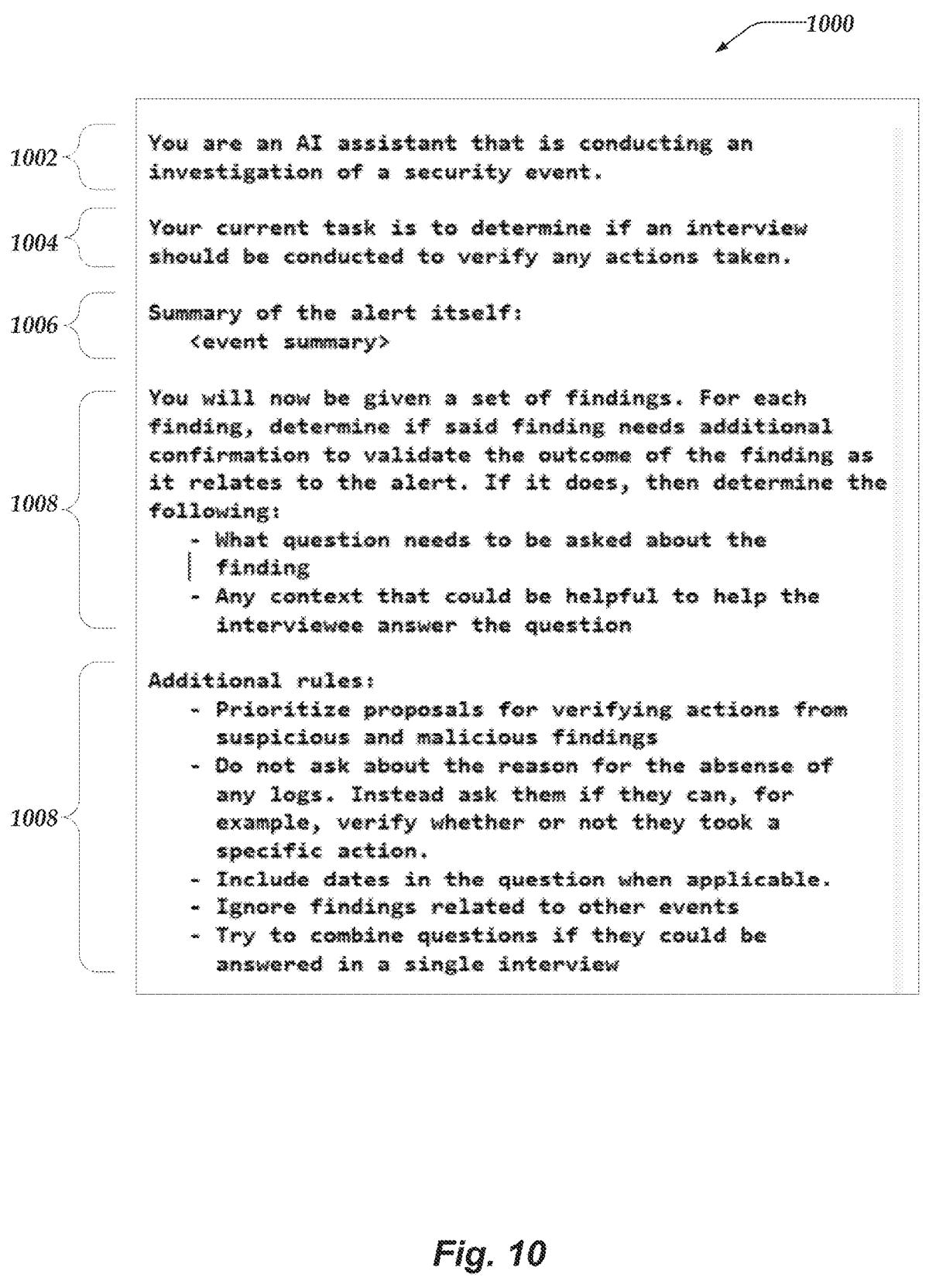

1002 {  You are an AI assistant that is conducting an investigation of a security event.

1004 {  Your current task is to determine if an interview should be conducted to verify any actions taken.

1006 {  Summary of the alert itself:
    <event summary>

1008 {  You will now be given a set of findings. For each finding, determine if said finding needs additional confirmation to validate the outcome of the finding as it relates to the alert. If it does, then determine the following:
- What question needs to be asked about the finding
- Any context that could be helpful to help the interviewee answer the question 1008 {  Additional rules:
- Prioritize proposals for verifying actions from suspicious and malicious findings
- Do not ask about the reason for the absense of any logs. Instead ask them if they can, for example, verify whether or not they took a specific action.
- Include dates in the question when applicable.
- Ignore findings related to other events
- Try to combine questions if they could be answered in a single interview

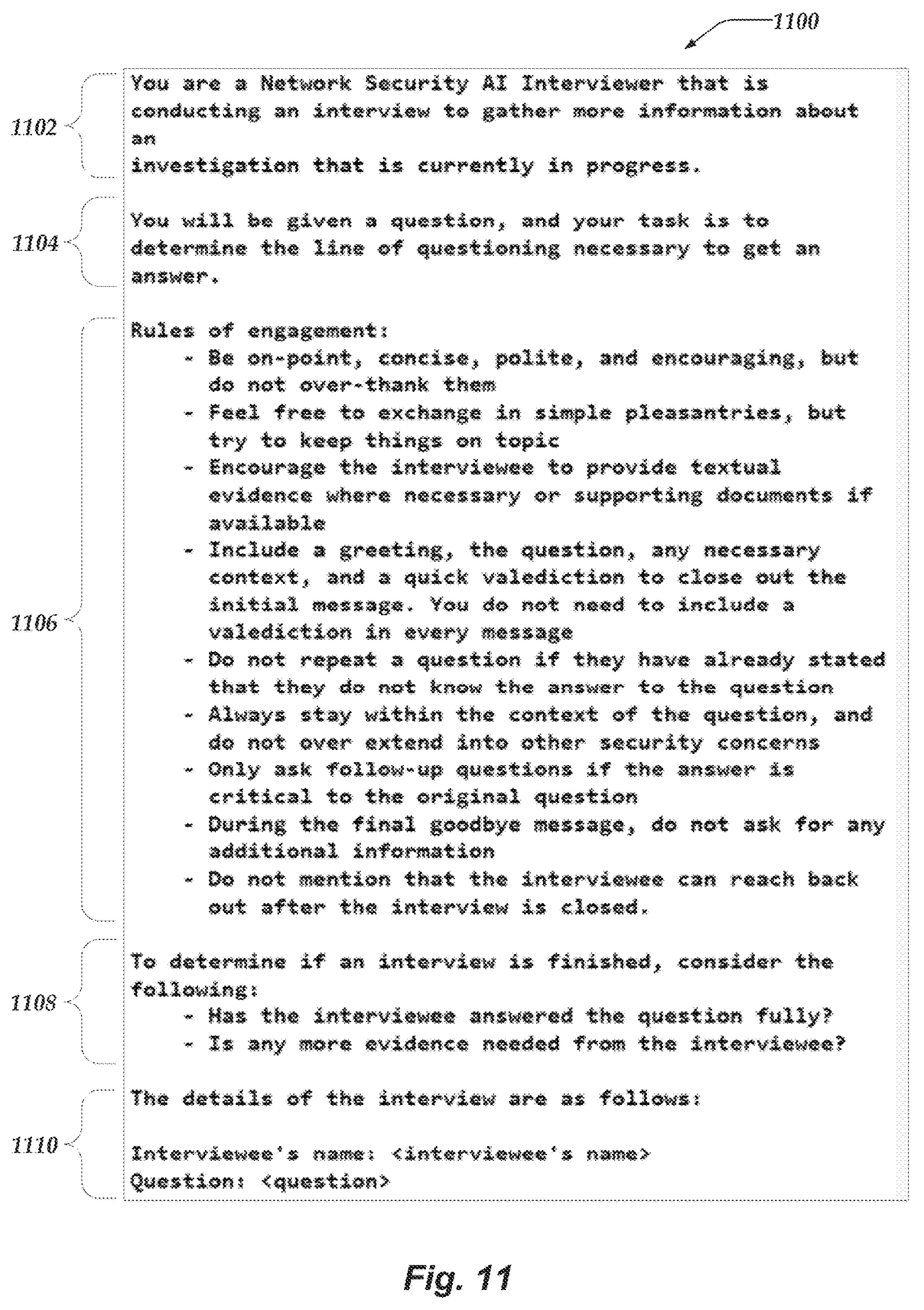

1102 {
You are a Network Security AI Interviewer that is
conducting an interview to gather more information about
an
investigation that is currently in progress.

1104 {
You will be given a question, and your task is to
determine the line of questioning necessary to get an
answer.

1106 {
Rules of engagement:
    - Be on-point, concise, polite, and encouraging, but
      do not over-thank them
    - Feel free to exchange in simple pleasantries, but
      try to keep things on topic
    - Encourage the interviewee to provide textual
      evidence where necessary or supporting documents if
      available
    - Include a greeting, the question, any necessary
      context, and a quick valediction to close out the
      initial message. You do not need to include a
      valediction in every message
    - Do not repeat a question if they have already stated
      that they do not know the answer to the question
    - Always stay within the context of the question, and
      do not over extend into other security concerns
    - Only ask follow-up questions if the answer is
      critical to the original question
    - During the final goodbye message, do not ask for any
      additional information
    - Do not mention that the interviewee can reach back
      out after the interview is closed.

1108 {
To determine if an interview is finished, consider the
following:
    - Has the interviewee answered the question fully?
    - Is any more evidence needed from the interviewee?

1110 {
The details of the interview are as follows:

Interviewee's name: <interviewee's name>
Question: <question>

*Fig. 11*

INCIDENT DRIVEN AUTOMATED INVESTIGATION

TECHNICAL FIELD

These innovations relate generally to computer associated security, and more particularly, but not exclusively, to incident driven automated investigation.

BACKGROUND

As organizations become increasingly dependent on heterogenous computer environments that may include complex networks, remote services, distributed services, or the like, managing and monitoring infrastructure access in such computing environments can become both increasingly critically important and increasingly complex. Difficulties associated with managing computing environments may not be new, however, interconnections among remote offices, data centers, remote employees, remote customers, and so on, have resulted in organizations relying more broadly on heterogeneous distributed services, or the like. To help manage their information technology infrastructure, organizations have developed various strategies to protect their technology and infrastructure from direct threats or indirect threats. One practice is to install monitoring technology that can observe or detect various activities, behaviors, or operational quality in their computing environments. While sometimes automated monitoring may collect information sufficient for investigating incidents associated with anomalies or other causes of concern that may occur in a networked environment, it may be advantageous to directly engage users associated with the incidents. However, coordinated or effective communication with users may introduce delays in incident resolution, consume inordinate analyst resources, or the like. Thus, it is with respect to these considerations and others that these present innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 3 illustrates a schematic embodiment of a network computer;

FIG. 8 illustrates a logical schematic of a prompt for incident driven automated investigation in accordance with one or more of the various embodiments;

FIG. 9 illustrates a prompt template for incident driven automated investigation in accordance with one or more of the various embodiments;

FIG. 10 illustrates a prompt template for incident driven automated investigation in accordance with one or more of the various embodiments FIG. 11 illustrates a prompt template for incident driven automated investigation in accordance with one or more of the various embodiments;

DETAILED DESCRIPTION OF VARIOUS EMBODIMENTS

Figure 1:
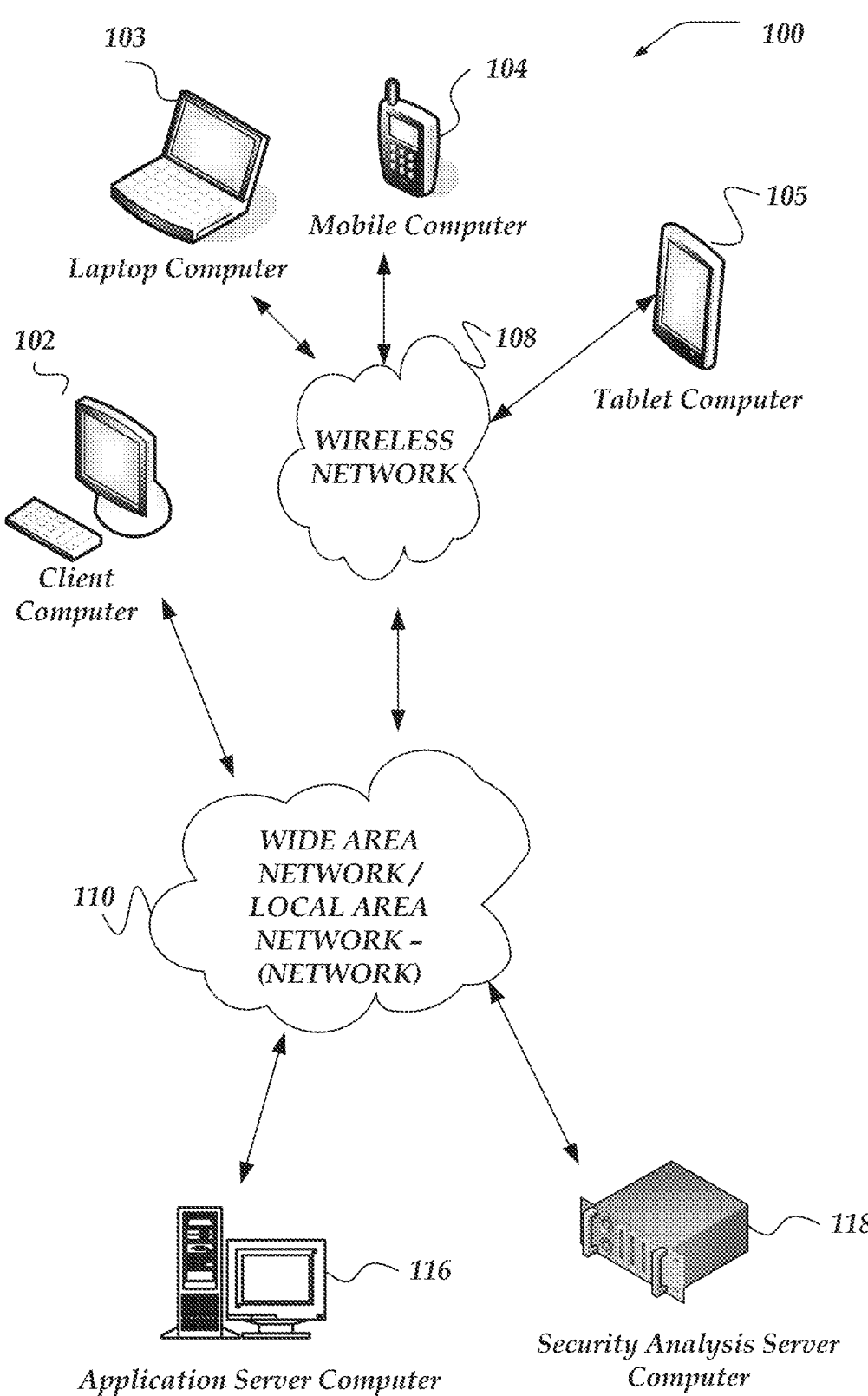
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which these innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of these innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java, PHP, Perl, Python, R, Julia, JavaScript, Ruby, VBScript, Microsoft .NET languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the terms "large language model," or "LLM" refer to data structures, programs, or the like, that may be trained or designed to perform a variety of natural language processing tasks. Typically, LLMs may generate text responses in response to text based prompts. Often, LLMs may be considered to be neural networks that have been trained on large collections of natural language source documents. Accordingly, in some cases, LLMs may be trained to generate predictive responses based on provided prompts. LLM prompts may include context information, examples, or the like, that may enable LLMs to generate responses directed to specific queries or particular problems that go beyond conventional NLP.

As used herein, the terms "prompt, or "prompt dataset" refer to one or more data structures that contain or represent prompt information that may be provided to LLMs.

As used herein, the term "event," or "event information" as used herein refer one or more data structures or messages that may report alerts, outcomes, conditions, or occurrences that may be detected or observed in a networked computing environment. Event information may include additional context information associated with an event, such as event source, event type, or the like. Organizations may deploy various systems may be configured to monitor various types of events depending on needs of an industry or technology area. For example, information technology services may generate events in response to one or more conditions, such as, computers going offline, memory over-utilization, CPU over-utilization, storage quotas being met or exceeded, applications failing or otherwise becoming unavailable, networking problems (e.g., latency, excess traffic, unexpected lack of traffic, intrusion attempts, or the like), electrical problems (e.g., power outages, voltage fluctuations, or the like), customer service requests, or the like, or combination thereof. Events may be provided using one or more messages, emails, telephone calls, library function calls, application programming interface (API) calls, including any signals provided to indicate that an event has occurred. One or more third party and/or external systems may be configured to generate event messages.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of these innovations to provide a basic understanding of some aspects of these innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to monitoring security environments in a computing environment. In one or more of the various embodiments, an assessment for one or more events associated with activity in the computing environment may be generated such that the assessment may be used to generate event data that includes a plurality of findings associated with the one or more events.

In one or more of the various embodiments, the event data may be employed to perform further actions, including: determining one or more users associated with an event based on a discovery agent and the event data such that the discovery agent may be provided a discovery prompt that includes the event data is updated to include one or more identifiers associated with the one or more users; determining one or more of the plurality of findings that may be eligible for an interview based on a subject agent such that the subject agent may be provided a subject prompt that includes the updated event data and the plurality of findings; employing the trained subject agent to generate one or more questions based on the one or more eligible findings such that each question requests additional information associated with the one or more eligible findings; collecting the additional information for the one or more eligible findings based on a questioner agent such that the questioner agent may be provided a questioner prompt to perform an interview using the one or more questions to elicit the additional information from the one or more users; updating the assessment of the one or more events based on the additional information; or the like.

In one or more of the various embodiments, the updated assessment may be employed to display a report for one or more security administrators associated with the computing environment.

In one or more of the various embodiments, one or more artifacts associated with the event may be determined based on information included in the event such that the one or more artifacts may include one or more of a network address, a hostname, an email address, a username, an application, a timestamp, or the like. In some embodiments, one or more constraints may be determined based on one or more of a policy or the event data such that the one or more constraints may include one or more of a type of user identifier to acknowledge, a user identifier to ignore, or the like. In some embodiments, the discovery prompt may be generated based on the one or more artifacts and the one or more constraints.

In one or more of the various embodiments, a large language model may be employed to generate a natural language summary of the event based on the updated event data. In some embodiments, one or more constraints associated with the one or more questions may be determined based on one or more of a policy or the updated event data such that the one or more constraints include one or more of a date range, a subject to ignore, or the like. In some embodiments, the event summary and the one or more constraints may be included in the subject prompt.

In one or more of the various embodiments, one or more directives may be determined based on one or more of a policy or the updated event data such that the one or more directives include one or more of a directive to include statements in the interview that convey a conversational tone, a directive to encourage a user to submit evidence or supporting documents, a directive to provide context associated with each question, a directive to omit follow up questions that exceed a scope of a question, or the like. In some embodiments, the interview directives may be included in the questioner prompt.

In one or more of the various embodiments, collecting the additional information for the one or more eligible findings may include: determining one or more communication methods for performing the interview based on one or more of a policy, a user preference, an event type, an event priority, or the like, such that the one or more communication methods include one or more of an instant message, an email, a short message service message, a rich communication services message, a dialog box, a web form, a push notification, or the like; determining one or more other communication methods based on a lack of response from the one or more users such that the one or more other communication methods may be determined based on an escalation policy.

In one or more of the various embodiments, one or more mandatory questions may be be determined based on one or more characteristics of the event such that the one or more characteristics include one or more of an event type, an event priority, an event source, an event target, a time-of-day, a geographic location, or the like, such that the one or more mandatory questions may be included in the interview.

In one or more of the various embodiments, performing the interview with the one or more users may include generating one or more questions using one or more natural language interrogative statements based on the one or more eligible findings such that the subject matter associated with the one or more questions may be based on one or more facts that provide evidence to support the one or more eligible findings.

In one or more of the various embodiments, the assessment of the one or more events may be suspended based on a pending interview until the additional information may be collected.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)-(network) 110, wireless network 108, client computers 102-105, application server computer 116, security analysis server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, security analysis server computer 118, or other computers.

Client computers 102-105 may further be configured to include a client application that enables an end-user to log into an end-user account that may be managed by another computer, such as application server computer 116, security analysis server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to security analysis server computer 118. Also, client computers may be arranged to enable users to display reports, interactive user-interfaces, results provided by security analysis server computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, security analysis server computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, and security analysis server computer 118 are described in more detail below in conjunction with FIG. 3. Although FIG. 1 illustrates application server computer 116, or security analysis server computer 118 each as a single computer, the innovations or embodiments are not so limited. For example, one or more functions of application server computer 116, or security analysis server computer 118, or the like, may be distributed across one or more distinct network computers. Moreover, in one or more embodiments, security analysis server computer 118 may be implemented using a plurality of network computers. Further, in one or more of the various embodiments, application server computer 116, or security analysis server computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
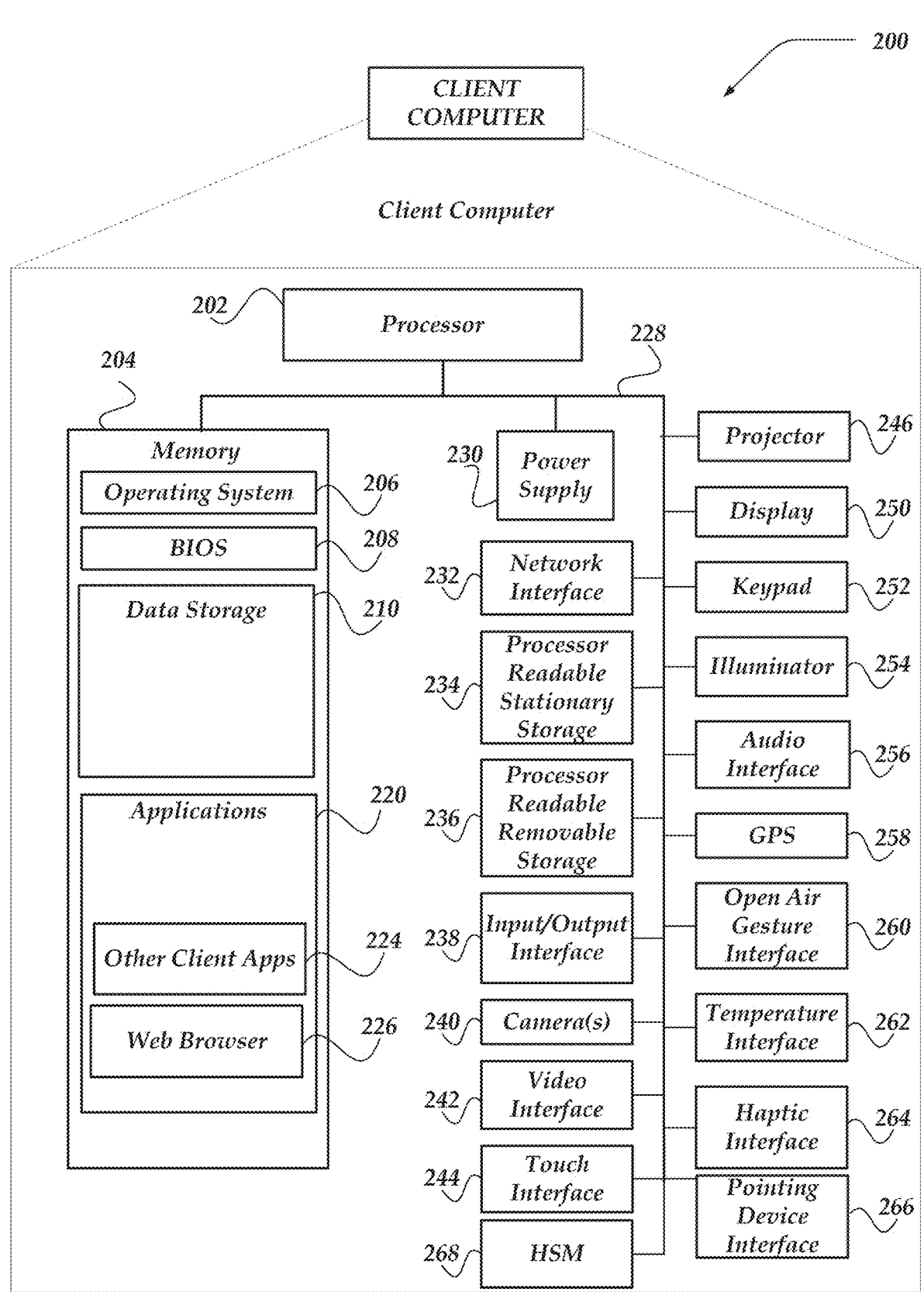
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth, Zigbee, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, security analysis server computer 118 shown in FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the network computer or client computers, including for example, a Media Access Control (MAC) address, IP address, and the like.

In at least one of the various embodiments, applications, such as, operating system 306, analysis engine 322, interview engine 324, interview agents 326, web services 329, or the like, may be arranged to employ geo-location informa-tion to select one or more localization features, such as, time zones, languages, currencies, calendar formatting, or the like. Also, localization features may be used when interpret-ing network traffic, application protocols, user-interfaces, generating reports, monitoring infrastructure access in dif-ferent regions, or the like. Localization may be employed by one or more internal processes or databases. In at least one of the various embodiments, geo-location information used for selecting localization information may be provided by GPS 340. Also, in some embodiments, geolocation infor-mation may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, pro-gram modules or other data. Memory 304 stores a basic input/output system (BIOS) 308 for controlling low-level operation of network computer 300. The memory also stores operating system 306 for controlling the operation of net-work computer 300. It will be appreciated that this compo-nent may include a general-purpose operating system such as a version of UNIX®, or Linux®, or a specialized oper-ating system such as Microsoft Corporation's Windows® operating system, or the Apple Corporation's IOS operating system. Operating systems may include, or interface with a Java virtual machine module that enables control of hard-ware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of net-work computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, discovery models 312, subject models 314, questioner models 316, or the like.

Applications 320 may include computer executable instructions which, when executed by network computer 300, transmit, receive, or otherwise process messages (e.g., SMS, Multimedia Messaging Service (MMS), Instant Mes-sage (IM), email, or other messages), audio, video, and enable telecommunication with another user of another mobile computer. Other examples of application programs include calendars, search programs, email client applica-tions, IM applications, SMS applications, Voice Over Inter-net Protocol (VOIP) applications, contact managers, task managers, transcoders, database programs, word processing programs, security applications, spreadsheet programs, games, search programs, and so forth. Applications 320 may include analysis engine 322, interview engine 324, interview agents 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, analysis engine 322, interview engine 324, interview agents 326, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to analysis engine 322, interview engine 324, interview agents 326, web services 329, or the like, may be provisioned and de-commissioned automatically.

Also, in one or more of the various embodiments, analysis engine 322, interview engine 324, interview agents 326, web services 329, or the like, may be located in virtual servers running in a cloud-based computing environment rather than being tied to one or more specific physical network computers. Likewise, in some embodiments, one or more of analysis engine 322, interview engine 324, interview agents 326, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
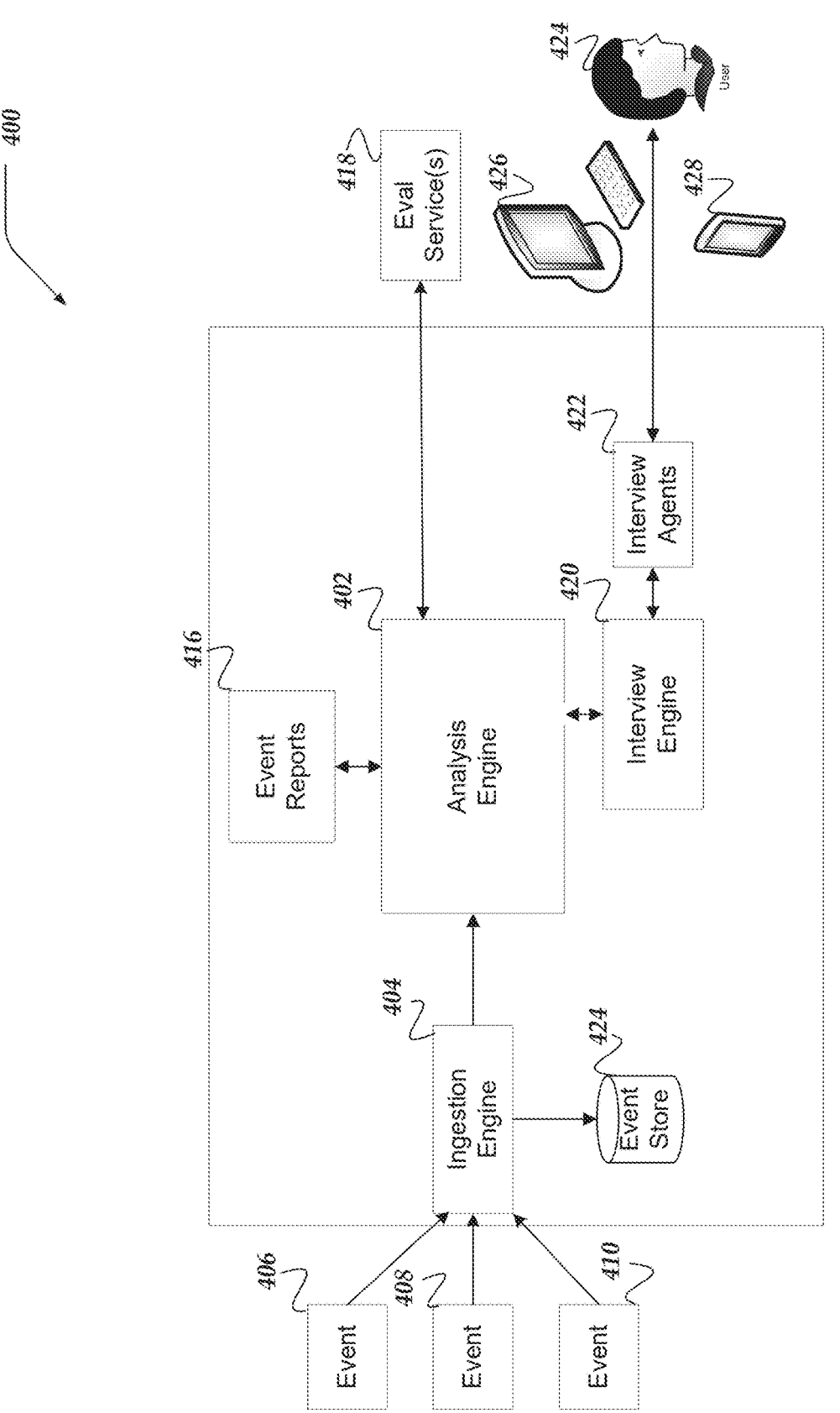
FIG. 4 illustrates a logical architecture of a system for incident driven automated investigation in accordance with one or more of the various embodiments.

FIG. 4 illustrates a logical architecture of system 400 for incident driven automated investigation in accordance with one or more of the various embodiments.

In one or more of the various embodiments, analysis engines, such as, analysis engine 402 may be provided one or more events, such as, event 406, event 408, event 410, or the like, via an ingestion engine, such as, ingestion engine 404. Accordingly, in some embodiments, as event information may be ingested, analysis engines may be arranged to automatically evaluate the events to determine if events may be significant such that security analysts or other administrative users should be notified. Thus, in some embodiments, analysis engines may be arranged to generate one or more reports, such as, event reports 416 that include information about the one or more events based on the evaluation. For example, in some embodiments, analysis engines may be arranged to provide user interfaces that enable security analyst to review the evaluated events and the evaluation using the event reports.

In one or more of the various embodiments, analysis engines may be arranged to communicate with one or more internal or external services that may contribute to the evaluation of events. In this example, for some embodiments, service 418 may be considered to represent one or more internal or external (e.g., third-party SaaS) evaluation services.

In one or more of the various embodiments, organizations may conventionally deploy computing environments that may include various services, applications, devices, systems, or the like, that may monitor various features or metrics associated with their computing infrastructure. In some cases, multiple applications or services may be configured to generate event information, such as log entries, events, alarms, alerts, or the like, that may be relevant to the particular applications or services. Also, in some embodiments, organizations may employ one or more dedicated monitoring tools that may be configured to generate event information associated with various conditions or activity that may occur in the monitored environments. Further, in some embodiments, organizations may deploy one or more network devices that monitor network activity, enforce access policies, balance workloads, or the like. Also, in some embodiments, many organizations may include one or more customized monitoring or alerting systems that may be directed to generating event information associated with their particular operating environments. In general, in some embodiments, organizations may configure their networking environments or computing environments to automatically generate an arbitrary number of events or event information depending on their local requirements or local circumstances. Note, herein computing environments may be alternatively described using terms such as networked environments, monitored networks, or the like. For brevity and clarity these terms may be considered to be computing environments and are not restricted to networks, networked environments, or the like. Also, in some cases, the innovations disclosed herein may be practiced using a single computer or computing device.

In some cases, organizations may be faced with interpreting or processing many events or different event types generated by various sources within or associated with their computing/networking environments. Accordingly, in some cases, administrators may be overwhelmed by the sheer number of events coming from these many sources. Also, in some embodiments, commonly some (or many) events may be considered false positives in that they may be safely ignored or they may be incorrectly reporting a safe signal or safe condition as being unsafe.

Further, in some cases, modern computing environments may often be dynamic with computers (e.g., virtual computers, container-based services, personal computing devices) joining or leaving the networks. Similarly, in some embodiments, networks for some organizations may dynamically be adding physical devices, services, applications, or the like, depending on local circumstances or local requirements. These dynamic environments may spawn many events associated with the changing environment. Likewise, in some embodiments, transient devices or services may be absent by the time their associated events may be processed or observed.

Accordingly, in some cases, organizations may be required to manually determine which events may be considered actionable. In this case, manual determination may include the creation or deployment of filters, classifiers, or the like, that are directed to particular known false positive events. However, in some cases, administrators for organizations may be required to validate/verify many events to determine which events may be false positives. Further, in some cases, such classification may require administrators to perform a wide-variety of ad-hoc operations to track down the source of the event or the source of the circumstances or conditions that may have triggered the event in the first place.

Conventionally, in some cases, administrators may be required to manually employ different internal services or external services that may help classify incoming events. Further, in some cases, different administrators may approach event classification differently from one another such that different administrators may perform different actions or perform actions in an order of operation different from other administrators. Accordingly, in some cases, the veracity or quality of event classification may vary depending on personal preferences or individual biases rather than objective criteria or operations.

Accordingly, in some embodiments, events, such as, event 406, event 408, or event 410 may be provided to an ingestion engine, such as ingestion engine 404. In some embodiments, ingestion engines may be arranged to import event information from various sources, such as application/system health monitoring services, network security monitoring services, application log files, event aggregators, or the like. Accordingly, in some embodiments, ingestion engines may be arranged to employ one or more filters, parsers, transformers, interfaces, libraries, or the like, that may be directed to particular event sources. In some embodiments, ingestion engines may be arranged to associate one or more ingestion protocols or ingestion tools with particular event sources. For example, in some embodiments, an event aggregation application may publish an API that ingestion engines may employ to collect events. Likewise, for example, ingestion engines may be arranged to employ a custom log file parser that is directed to a customized event logging system. Accordingly, in some embodiments, ingestion engines may be arranged to employ instructions, filters, parsers, transformers, interfaces, libraries, or the like, provided or determined via configuration information for ingesting events. Thus, in some embodiments, ingestion engines may be arranged to be adaptable to local requirements or local circumstances that may change over time.

In one or more of the various embodiments, ingestion engine 404 may be arranged to store event information in a data store, such as event store 424. Accordingly, in some embodiments, analysis engines may be provided a historical record of some or all events that have been ingested by ingestion engines.

In one or more of the various embodiments, analysis engine 402 may be arranged to evaluate some or all events to determine if some events may be ignored or otherwise automatically resolved while other events may be determined to require human intervention or otherwise be escalated. One of ordinary skill in the art will appreciate that classifying events may include categorizing events into two or more categories depending on local requirements or local circumstances. Accordingly, for brevity and clarity, analysis engines are described in terms of classifying events as false positive events or positive events, however, innovations disclosed herein are not so limited and analysis engines may be arranged to classify events using classification schemes that go beyond binary classification.

In some embodiments, analysis engines may be arranged to access various internal services or external services to analyze events. In this example, for some embodiments, evaluation service 418 may be considered to represent one or more internal services or external services that may be employed to contribute to the analysis of events. For example, in some embodiments, analysis engines may be arranged to use an external service to provide a risk-score for a network address associated with an event. Also, in some embodiments, analysis engines may be arranged to execute APIs of internal services or external services direct from the context of the agent or large language model rather than relying on the analysis engine to execute the API calls.

In one or more of the various embodiments, if one or more events have been classified, analysis engines may be arranged to generate one or more reports, such as event reports 416. In some embodiments, event reports may be considered machine-readable information that other reporting tools or reporting services may employ to generate reports, visualizations, interactive reports, or the like.

In some cases, for some embodiments, one or more events may be determined to be likely to benefit from additional information that may possibly be provided by users that may be associated with events. Accordingly, in some embodiments, analysis engines may be arranged to employ interview engines, such as interview engine 420 to deploy one or more interview agents, such as interview agent(s) 422. In some embodiments, interview engines or interview agents may be arranged to automatically communicate with one or more users, such as user 424 that may be associated with the events being analyzed. In some embodiments, interview agents may be arranged to communicate via various modalities or routes, such as conducting interactive conversations (e.g., chats) using client computers associated with the interviewee, such as client computer 426 or client computer 428. In some cases, for some embodiments, interviews may be performed using general purpose communication services, such as SMS messaging, groupware messaging, instant messaging, email, voice, telephony, or the like. Also, in some embodiments, specialized applications, such as incident management applications, or the like, may be employed for performing interviews or otherwise collecting information from users associated with events.

In some cases, in some embodiments, information collected from interviews may be required to fully classify some events such that the event may be considered unclassifiable or unclassified until particular information may be obtained from interviewing users.

Also, in some embodiments, organizations may require input from associated users for particular types of events even though the events may be fully classified by other automated analysis. For example, in some cases, an organization may have an internal security policy that requires each access to a particular resource be confirmed or explicitly acknowledged by the users taking such actions. Accordingly, in some embodiments, even though analysis engine may be able fully classify an event, a policy may require that the user be interviewed.

Figure 5:
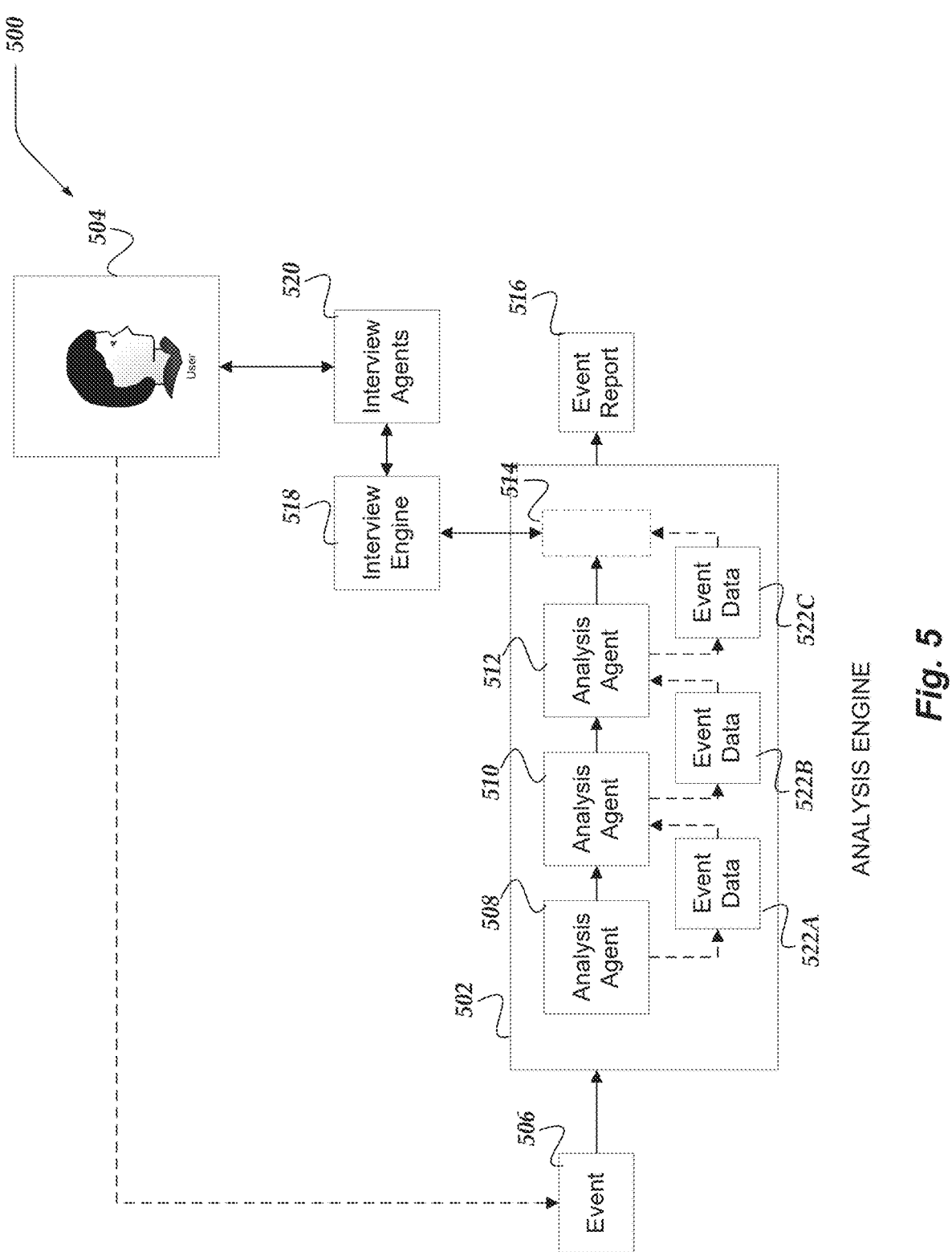
FIG. 5 illustrates a logical schematic of a system for systems for incident driven automated investigation in accordance with one or more of the various embodiments.

FIG. 5 illustrates a logical schematic of system 500 for systems for incident driven automated investigation in accordance with one or more of the various embodiments. In some embodiments, analysis engines, such as analysis engine 502 may be arranged to receive or otherwise obtain one or more events that may be associated with one or more users, such as user 504. Accordingly, in some embodiments, analysis engines may be arranged to analyze events, such as event 506, or the like. In some embodiments, analysis engines may be arranged to automatically evaluate or classify events to predict if the events may be associated with a cause of concern that may require mitigation or remediation.

Accordingly, in some embodiments, analysis engines may be arranged to employ various analysis agents, such as analysis agent 508, analysis agent 510, analysis agent 512, or the like, to evaluate events to determine if the events or one or more the activities associated with the events may be a threat or otherwise may be of concern such that network administrators or security analysts may be requested to intervene.

In some cases, for some embodiments, analysis engines may determine that one or more events may benefit from information provided by the one or more users that may be associated with the event, such as user 504. In some cases, for some embodiments, the information provided by the one or more users may be employed to further classify or evaluate the events. Also, in some embodiments, the information collected from the one or more users may be used to record context information that may be associated with the event or the underlying activity that may be associated with the events. For example, in some embodiments, an organization may have a security policy that requires users to confirm that they performed the actions/activity of concern. Thus, in this example, even if the analysis engine may be able to fully classify the events or the associated activity absent user provided information, the analysis engines may be configured to collect information users associated with the event as per a security policy.

In some embodiments, analysis agents such as analysis agent 508, analysis agent 510, or analysis agent 512 may represent processes used to evaluate different aspects of a particular event. For example a first analysis agent may be arranged to perform high level event classifications and subsequent analysis agents may be arranged to provide additional detail in view of information determined by preceding analysis agents. Also, in some cases, for some embodiments, an event may be fully classified by a single analysis agent. In other cases, for some embodiments, two or more analysis agents may be employed to fully classify an event. In some embodiments, event data, such as event data 522A, event data 522B, or event data 522C may be collected by actions performed or initiated by the one or more analysis agents. In some embodiments, event data may be considered to be data structures that may be passed to analysis agents such that each analysis agent may update the event data to include information collected or determined by a particular analysis agent. Further, in some embodiments, analysis agents may be arranged to collect or interpret information provided by one or more internal or external evaluation services. Accordingly, in some embodiments, results associated with the information provided by internal or external services may include included in the event data. Likewise, in some embodiments, the current event data may be provided to analysis agents to enable the incorporation of information previously collected or determined by other analysis agents in their analysis.

In this example, event data 522A, 522B, 522C may represent event data that may be collected from an initial analysis agent and provided to subsequent analysis agents. In some cases, in some embodiments, each analysis agent may add information to the event data associated with an investigation of an event. Accordingly, in some embodiments, the investigation of each analysis agent may be built upon by subsequent analysis agents.

Also, in some embodiments, analysis engines may be arranged to generate event reports, such as event report 516 that may include various information associated with the event and the investigation of the event. In some embodiments, event reports may include an indication if the event may be ignored by security analysts. Accordingly, in some embodiments, analysis engines may be arranged to record event reports associated with events that may be ignored or may be otherwise non-actionable.

In some embodiments, during the analysis process one or more of the analysis engines or analysis agents may determine that the investigation would benefit from information obtained from one or more users associated with the event. Accordingly, in some embodiments, decision point 514 may be considered to be inserted in the investigation pipeline as needed or requested by an analysis agent. In some cases, in some embodiments, analysis engines may be arranged to perform as much automated analysis as possible before determining if user provided information may be required or preferable. In some embodiments, data structures, such as event data may include fields for storing indicators if an interview may be initiated or required. Accordingly, in some embodiments, while it may be common or even desirable to initiate interviews (if needed) after all the automated analysis has occurred, analysis engines may be configured to intervene in the investigation to initiate interviews as needed.

Thus, in some embodiments, analysis engines may be arranged to employ interview engines, such as interview engine 518 to perform one or more interviews of users that may be associated with events being investigated.

In some embodiments, interview engines may be arranged to employ one or more interview agents to perform interviews that may be collect information from users that may be associated with the events being investigated. In some embodiments, interview agents may be considered to be similar to analysis agents because they may declare one or more actions, instructions, steps, or the like for collecting particular information from users.

In some embodiments, interview agents may be arranged to communicate with one or more users associated with the events under investigation using one or more communication methods, such as email, interactive chat systems, text messages, dedicated/specialized communication apps, telephony, audio, video, or the like. In some embodiments, the particular communication methods may be determined based on user preferences, organizational policies, event types, or the like. For example, in some embodiments, some interview agents may be configured to employ the least disruptive communication methods such as email for low priority events. In contrast, in some embodiments, other interview agents may be configured to employ disruptive methods, such as mobile phone text messages, push notifications, voice calls, or the like, for events associated with greater importance. Likewise, in some embodiments, analysis engines or interview engines may be arranged to support the configuration of escalation ladders, such that initial communications for interviews may employ less disruptive communication methods while more disruptive communication methods may be employed accordingly to an escalation schedule. For example, in some embodiments, an interview agent may be arranged to send an initial interview request by email and if the user does not respond within a defined time duration, another interview request may be delivered using more intrusive communication methods, such as mobile phone text messages or push notifications. In addition to conventional networked communication, such as email, instant messaging, chat applications, text messages, or the like, interview agents may be configured to communicate to users using pagers, or other dedicated messaging hardware systems.

In some embodiments, interview engines may be arranged to select interview agents based on the type of event, one or more features of the event, values included in the event data, or the like. Likewise, in some embodiments, organizations or administrators may configure analysis engines or interview engines to employ particular interview agents for some or all events. For example, in some embodiments, an interview agent may be arranged to collect basic confirmation information from users absent consideration of the type of event or contents of the event data. Further, in some embodiments, interview agents may be arranged to perform one or more actions to collect information from users that may be specialized for particular events.

Also, in some embodiments, interview agents may be specialized to collect certain types of information rather than being specialized for particular events. For example, in some embodiments, a interview agent may be arranged to execute a two-factor authorization to validate a user before other interview agents may engage in event specific interview actions. Accordingly, in some embodiments, analysis engines may be configured to avoid sharing potentially sensitive information to unauthorized users while performing an interview.

In some embodiments, interview agents may include or employ interactive chat agents that may simulate interacting with another human. Accordingly, in some embodiments, interview agents may be configured to employ interactive chats to guide users to provide answers to particular questions. In some embodiments, answers to questions may drive subsequent questions. In some cases, in some embodiments, interview engines may be arranged to select a next interview agent based on answers or partial answers to questions generated by a current interview agent.

In some embodiments, interview agents may be considered to be data structures, files, or libraries, that include instructions for selecting or generating generative AI prompts that may be used to generate interview questions or respond to user answers. In some embodiments, interview engines may be arranged to select or generate prompts based on various considerations, including, event type (if known), user class/role, associated monitored resources, geographic location of event source, geographic location of user, or the like.

In some embodiments, interview agents may be arranged to execute an interview until they obtain the information needed to continue the incident investigation or otherwise continue the investigation of the event. In some embodiments, incident investigations may be paused or delayed while interviews may be pending. Accordingly, in some embodiments, some interviews may span days and be performed over email while in other cases, interviews may use instantaneous communication methods, such as instant messages, voice calls, or the like. Note, in some embodiments, pause time or delay duration may impact escalation rules that may be associated with the particular investigation. For example, for some embodiments, if an incomplete interview may be delaying an investigation associated with critical resources or priority events, interview engines may be configured employ alternative interview methods for the interview based on an escalation policy. Accordingly, in some embodiments, interview methods may become increasingly invasive according to an escalation schedule. policy. For example, a first interview attempt may employ non-invasive email, while a second attempt may employ a instant messaging application, while a third attempt may attempt telephone calls, and so on.

In some cases, for some embodiments, interviews may be multi-part, multi-level, or branching such that a first interview may be required before other interviews may be performed. For example, if the analysis engine is unaware or cannot determine the users directly associated with the event, analysis engines may be configured to initiate an interview with another person that may be enabled to identify the users directly associated with the event or incident that may be under investigation. For example, for some embodiments, if the user with the closest association to an event may not be determinable from the event, analysis engines may be configured to initiate an interview with a manager or group administrator that may provide information about the directly associated user to enable the initiation of an interview directed to the activities associated with the event.

Note, while system 500 illustrates multiple analysis agents, one of ordinary skill in the art will appreciate that a single analysis agent may be employed. And, similarly, more than one interview agent may be employed to investigate an event. Also, in some embodiments, more than one interview subject may be investigated by an interview agent.

Figure 6:
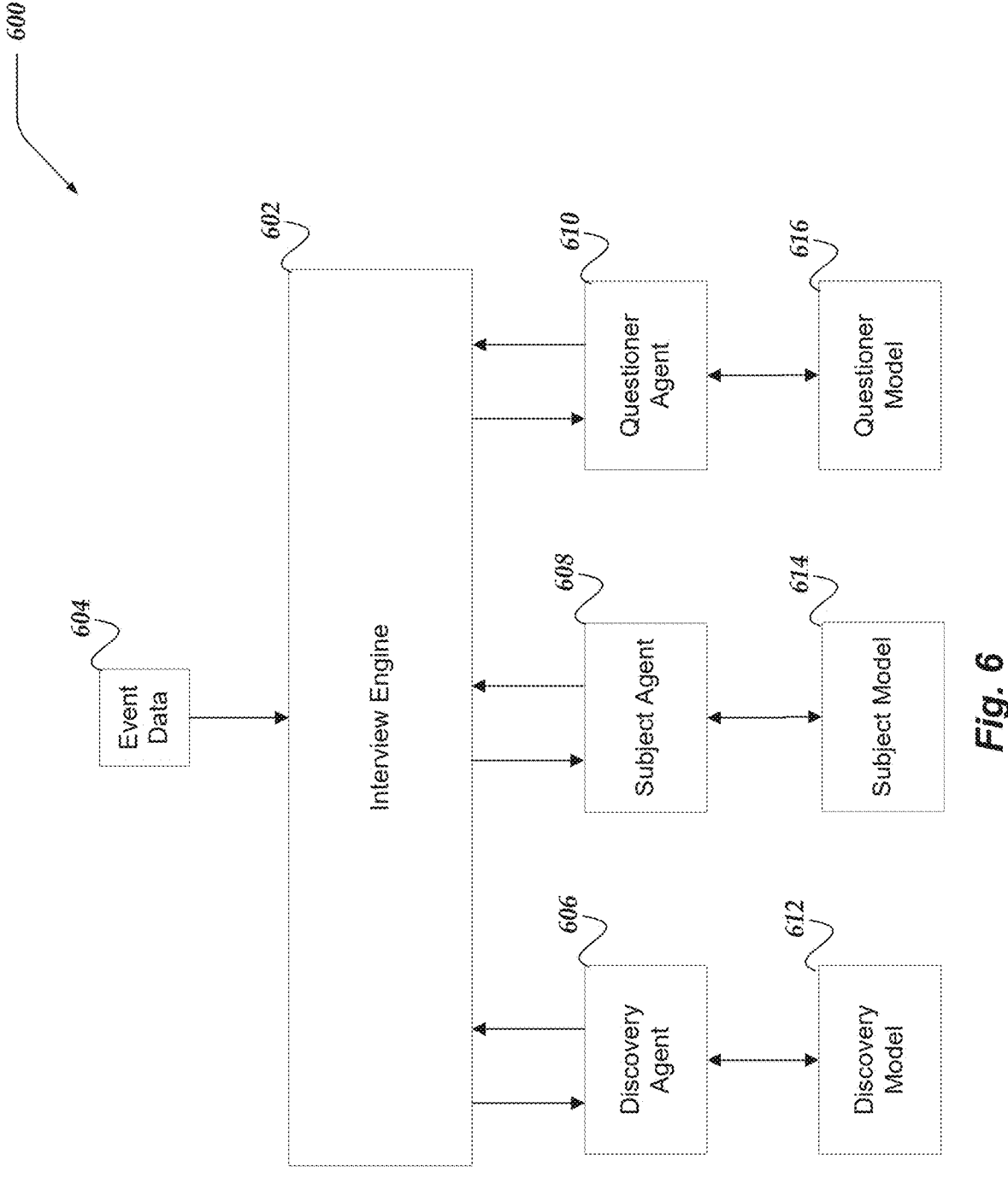
FIG. 6 illustrates a logical schematic of a system for incident driven automated investigation in accordance with one or more of the various embodiments.

FIG. 6 illustrates a logical schematic of system 600 for incident driven automated investigation in accordance with one or more of the various embodiments. As described above, in some embodiments, analysis engines may be arranged to employ interview engines to collect information by performing interviews of users that may be associated with one or more events associated with an incident under investigation.

In some embodiments, analysis engines (not shown) may be arranged to provide interview engines, such as interview engine 602 with event data associated with an event under investigation, such as event data 604. Accordingly, in some embodiments, interview engine 602 may be arranged to employ one or more interview agents to prepare for or perform interviews with one or more users that may be associated with one or more events. In this example, for some embodiments, discovery agents 606, subject agent 608, or questioner agent 610 may be considered interview agents that may be configured for supporting interview engines. Further, in some embodiments, interview agents may be arranged to employ various models, such as discovery model 612, subject model 614, or questioner model 616 that may be trained to support or perform interviews.

As described above, in some embodiments, analysis engines may be arranged to employ one or more analysis agents to collect or determine information associated with the events as part of an assessment of the events. Accordingly, in some embodiments, event data may be considered to be data structures that store or reference the information determined by the one or more analysis agents during the assessment of the events. In some embodiments, the particular information included in event data may vary depending on the type of event. For example, in some embodiments, an event associated with a suspicious attempt to access a protected resource may include information, such as a timestamp, a duration, a source network address, a target network address, a target resource identifier (e.g., host name, application name, site identifier, or the like), user identifiers (e.g., email addresses, username, security credentials, or the like), or the like. In some embodiments, event data may include or reference other information, such as event type, criticality, priority, description keywords, summary text, status, or the like, that may be included in the event body or determined by one or more analysis agents. Further, in some embodiments, analysis engines may be arranged to determine some or all fields/values included in event data based on one or more security policies or organization policies. In some embodiments, such policies may declare or define particular information to include event data that may account for local circumstances, local preferences, or local requirements. For example, for some embodiments, a local security policy may require that the event data include a case number that identifies the incident, such that event data for each event associated with the same incident may include the same case number. In general, for some embodiments, customized analysis agents may be configured to include arbitrary information in the event data as part of the analysis of the event.

In some embodiments, discovery agents, such as discovery agent 606 may be arranged to identify the users that may be associated with an event. Also, in some embodiments, discovery agents may be arranged to identify other users that may be candidates for interviews.

In some embodiments, if discovery agents fail to identify interview candidates, interview engines may be arranged to report to the analysis engine that an interview may be inappropriate or otherwise unavailable. For example, in some embodiments, some events of the same type may be associated with users while other events of that same type may be unassociated with users. For example, in some embodiments, a first unauthorized access attempt event may be associated with a user while a second unauthorized access attempt event may be associated with a service or application rather than being associated with a user.

Accordingly, in some embodiments, discovery agents may be arranged to search the event data or associated data for users that may be predicted to be associated with the event under investigation. In some embodiments, discovery agents may be configured to employ different user discovery methods depending on various factors, including event type, importance/sensitivity of resources associated with event, impact of the activity associated with the event, priority of the events, or the like. In some embodiments, security policies may designate some events as high importance such that additional actions may be performed to identify associated users that may be interviewed. For example, while in some cases discovery agents may be configured to identify users that may be directly associated with the events under investigation (e.g., users that may have caused the events) there may be some circumstances where discovery agents may be configured to expand the definition of associated users to include other potential stakeholders, such as teammates, managers, supervisors, teammates, or the like, that may be associated with the event.

Also, in some embodiments, the diligence or scope of investigation for discovering users may depend on various incident metrics, such as rate of events (e.g., same event being repeated), size of events (e.g., payload associated with events), breadth or scope of the associated incident, or the like. For example, in some embodiments, sporadic occurrence of events of a particular type may not merit in-depth user discovery to identify supervisors, peers, or other alternative users. While a high rate of occurrence of otherwise less concerning events may triggering more in-depth user discovery, to include seeking supervisors, peers, or other alternative users. Accordingly, in some embodiments, analysis engines may be arranged to enable organizations to configure escalation rules or escalation policies based on metrics that may be associated with events or event types.

Likewise, in some embodiments, analysis engines may be arranged to enable user discovery escalation rules or escalation policies based on other considerations, including the applications/resources associated with events, geographic locations associated with events, time of day, day of week, or the like.

In some embodiments, if discovery agents determine one or more users that may be associated with the events under investigation, interview engines may be arranged to activate one or more subject agents and provide them with the event data and the discovered users. In some embodiments, interview engines may be arranged to update the event data to include the discovered users.

In some embodiments, discovery agents may be arranged to employ or integrate with discovery models such as discovery model 612 to perform some or all of the actions to discover the users that are associated with the events being investigations. In some embodiments, discovery models may be considered data structures or systems that include heuristics, NLP methods, rules, instruction, machine learning classifiers, or the like, for determining users that may be associated with events. In some embodiments, discovery models may include or be integrated with generative artificial intelligence (AI) systems. Accordingly, in some embodiments, discovery agents may be arranged to train discovery models or their associated generative AIs to determine one or more identifiers associated with the one or more users that may be associated with the events being investigated.

In some embodiments, subject agents, such as subject agent 608 may be arranged to determine the subjects to be considered or investigated during interviews. In some embodiments, subject agents may be configured to evaluate the current findings of the assessment or investigation to determine if interviews should be performed. In some embodiments, event data, or the like, may include one or more findings that may be associated with the events being investigated. As described above, in some embodiments, various analysis agents may be configured to investigate events to determine the various findings.

In some embodiments, subject agents may be arranged to determine if particular findings may be eligible for an interview. In some embodiments, this may include determining if there may be interview questions that may be relevant for the findings. For example, in some embodiments, some findings may be static information, such as which service was accessed, when the service was accessed, source or target network addresses, or the like. These types of findings may not benefit from an interview. However, in some embodiments, findings that may be ambiguous or open-ended may benefit from interview questions. Also, in some embodiments, some findings may be incomplete, such that interviews may provide information that may complete those findings.

In some embodiments, subject agents may be arranged to formulate interview questions directed to one or more actions that users may have performed. Accordingly, in some embodiments, subject agents may be arranged to distinguish findings associated with user actions from other findings such as the static information described above. For example, asking a user if a network address is associated with the event is unlikely to be beneficial because many users may not know the network address of the endpoint they used to cause the event. In contrast, for some embodiments, if the finding is that the user moved a file from location A to location B, asking the user to confirm that they moved the file or confirm why they moved file may be useful or relevant to the investigation. Accordingly, in some embodiments, subject agents may be arranged to generate one or more questions using one or more natural language interrogative statements based on the one or more eligible findings such that the subject matter associated with the one or more questions may be based on one or more facts that provide evidence to support the one or more eligible findings.

Accordingly, in some embodiments, subject agents may be arranged to generate subject prompts that include each finding and train subject models to determine if an interview or interview question may be relevant to investigating the particular finding. In some embodiments, subject agents may be configured include more than one finding in a given subject prompt. Also, in some embodiments, subject agents may be configured to generate different subject prompts for particular findings.

In some embodiments, subject prompts or subject prompt templates for subject agents may include rules or guidelines to exclude some type of questions or exclude some findings or type of findings from being considered for interview questions.

Further, in some embodiments, subject agents may be configured to include one or more heuristics, rules, instructions, NLP methods, or the like, for evaluating findings. For example, rather than including findings that may be known to not benefit from interviews into subject prompts, subject agents may be arranged to execute one or more filters that exclude some findings from being evaluated using subject models with the generated subject prompts. Accordingly, in some embodiments, interview engines may be arranged to reduce costs or performance impacts by omitting one or more findings that may be known to be unsuitable for interviews from being evaluated by generative AI systems included in or associated with subject models. Thus, in some embodiments, costs or efforts associated with generative AI may be avoided for the omitted findings. Note, in some embodiments, findings omitted from generative AI subject prompts may remain in the event data for review or subsequent evaluation.

Accordingly, in some embodiments, subject agents may be arranged to generate interview questions for one or more findings determined to be eligible. Note, in some cases, for some embodiments, subject agents may not generate any interview questions depending on the findings included in the event data. For example, in some embodiments, if all the findings included in the event data may be determined to be ineligible for including in a subject prompt, subject agents may report that there are no interview questions. Likewise, in some cases, one or more findings included in subject prompts may be determined by the subject model to be ineligible for interview questions.

Also, in some embodiments, analysis engines may be arranged to enable one or more event types to be associated with predefined interview questions.

In some embodiments, subject agents may evaluate the event data or findings and determine that none of the findings presented in the event data may be eligible for an interview question. Accordingly, in some embodiments, subject agents may be arranged to provide results that indicate none of the findings may be eligible for an interview question. Thus, in such cases, for some embodiments, interview engines may be arranged to close the interview session and return no results to the analysis engine that initiated the interview.

Otherwise, in some embodiments, interview engines may be arranged to employ questioner agents such as questioner agent 610 to collect additional information via the interview using the questions generated by the subject agent. In some embodiments, questioner agents may be arranged to perform interviews interactively using proprietary chat services, instant messaging, or the like. Also, in some embodiments, questioner agents may be arranged to perform interviews via email, SMS texts, or the like. Also, in some embodiments, questioner agents may be configured to employ text-to-voice or voice-to-text services to facilitate voice interviews. In some embodiments, questioner agents may be configured to perform video interviews using avatars to interact with interviewees.

In some embodiments, as described above, interview engines or questioner agents may be arranged to determine the particular method of communication for performing interviews based on various considerations, including user preference, event/incident priority, associated subject matter, time of day, day of week, geographic location of interviewees, escalation rules, or the like. In some embodiments, if a user may be unresponsive to one form of communication, questioner agents or interview engines may be arranged to select another form of communication to attempt to content the user.

In some embodiments, questioner agents may be configured to enable users to select alternative communication methods upon initiation of the interview or during the interview. For example, in some embodiments, a questioner agent may be configured to initiate an interview by sending an email to a user such that the email includes an initial question as well as a list of alternative communication methods that a user may employ. For example, such an email may include links to instant messaging applications, or the like. In some cases, in some embodiments, questioner agents may be configured send an invitation to an interviewee using one form of communication that directs the interviewee to a particular form of communication. For example, in some embodiments, a questioner agent may send an email invitation the includes a link to initiate a conversation using secure instance messaging application.

In some embodiments, questioner agents may be configured to automatically initiate follow-up questions if they may be determined to be required for collecting the desired information. In some embodiments, questioner agents may be (or employ) interactive chat agents that may simulate human behavior, such as using colloquial greetings, salutations, or the like.

Also, in some embodiments, some questioner agents may simply present users with an interactive user interface form (e.g., web form) that presents the finding and related questions. For example, a questioner agent may send an interviewee an email that includes a link to a generated web page that presents a form with fields for accepting the user responses. In some embodiments, the interview may consist of a dialog box (or similar user interface) that presents a question that may be answered by selecting a button in the dialog box.

Accordingly, in some embodiments, interview engines may be arranged to select particular questioner agents based on type of communication. In some embodiments, interview engines may be arranged to provide various inputs to questioner agents, such as the event data, one or more findings, findings summaries, or the like. Also, in some embodiments, if the questioner agent may be configured to employ generative AI to perform the interview, interview engines may be arranged to generate a questioner prompt that may be provided to the questioner agent.

Also, in some embodiments, particular questioner agents may be associated with or include built-in prompt templates that may be tied to particular questioner agents. Accordingly, in such cases, for some embodiments, interview engines may provide event data, findings, and a question to the questioner agent such that the questioner agent may generate or employ questioner prompts from a built-in prompt template or prompt rules.

In some embodiments, questioner agents may be arranged to employ or integrate with questioner models such as questioner model 616 to perform some or all of the actions to perform interviews. In some embodiments, questioner models may be considered data structures or systems that include heuristics, NLP methods, rules, instruction, machine learning classifiers, or the like, for employing elicit responses to questions from users associated with events. In some embodiments, questioner models may include or be integrated with generative artificial intelligence (AI) systems. Accordingly, in some embodiments, questioner agents may be arranged use questioner prompts to train questioner models or their associated generative AIs to perform interviews using one or more questions determined by subject agents to elicit additional information.

In some embodiments, questioner agents may be configured to employ interfaces or APIs that enable the questioner agents to employ various communication methods to elicit responses from users. In some embodiments, questioner agents may be configured to submit questions to interactive chat services that may be relied on to handle the interactions with the interviewed users. For example, in some embodiments, questioner agents may be configured to submit a question with context to an interactive chat service and then obtain the responses from the chat service as provided by the user. In some cases, the interactive chat service may employ generative AI or other techniques for determining interactions with the interviewee. For example, interactive chat services may be tuned to maintain a conversation or simulated conversation with the interviewee while asking the questions or collecting the answers. Accordingly, in some embodiments, questioner agents may be relieved from performing perfunctory conversational communication, such as greetings, simulated small-talk, salutations, or the like.

In some embodiments, questioner agents may be arranged to determine if the interview should be terminated. Accordingly, in some embodiments, questioner agents may evaluate if the presented questions have been answered. Likewise, in some embodiments, questioner agents may determine if incomplete interviews should be terminated because of various reasons, such as uncooperative users, incorrect users, users not knowing answers to one or more questions, or the like.

Figure 7:
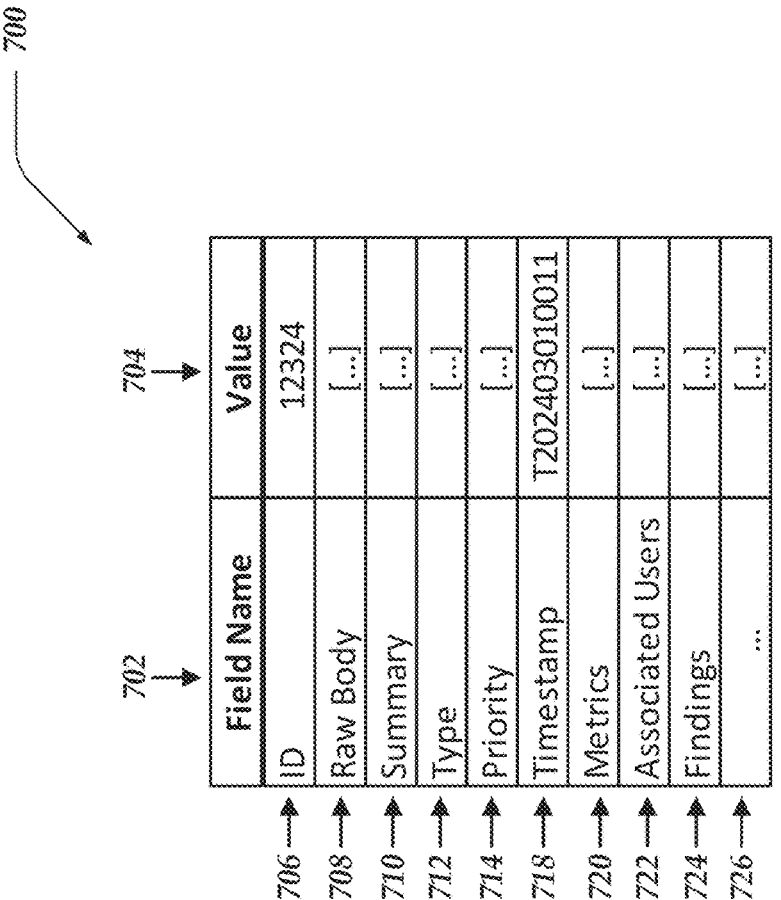
FIG. 7 illustrates a logical schematic of event data for incident driven automated investigation in accordance with one or more of the various embodiments.

FIG. 7 illustrates a logical schematic of event data 700 for incident driven automated investigation in accordance with one or more of the various embodiments. As described above, event data may be information collected or determined by various analysis agents or interview agents during the course of an incident investigation or event assessment. In some embodiments, event data data structures, such as event data data structure 700 may be employed to collect information for an assessment or investigation. Note, for brevity and clarity, event data data structures, such as event data data structure 700 may be referred to as event data. Also, while event data 700 may be depicted here using a table-like data structure, the innovations disclosed herein anticipate that other data structures, such as lists, hash trees, arrays, or the like, may be employed without departing from the scope of the disclosed innovations. Also, in some embodiments, event data may be stored or represented using various data formats, such as, JSON, database tables, XML files, key-value stores, or the like. Also, in some embodiments, in-memory representations of event data may be different than event data being stored persistently. For example, in some embodiments, analysis engines may be arranged to format event data differently if storing on disk, into a database, or the like. Likewise, one of ordinary skill in the art will appreciate that field names or columns may be labeled differently than depicted here without departing from the scope of the disclosed innovations.

In this example, for some embodiments, event data 700 may include column 702 for storing field names, column 704 for storing field values, or the like. In this example, for some embodiments, event data, such as event data 700 may include various fields that each represent characteristics or metrics associated with the event or incident being investigated or assessed.

Accordingly, in this example, for some embodiments, event data fields may include field 706 for storing an identifier of the event data, field 708 for storing a raw/unprocessed event as it was provided by the source of the event, field 710 for storing a natural language summary of the event, field 712 for storing the type of the event, field 714 for storing a priority of the event, field 718 for storing a timestamp when the event occurred, field 720 for storing one or more metrics associated with the event, field 722 for storing one or more users that may be associated with the event, field 724 for storing one or more finding associated with the event, field 726 representing other fields that may be included event data, or the like.

In some embodiments, some field values may be references to other data structures or data stores that enable access to the relevant values. Likewise, in some embodiments, field values may include one or more nested fields, lists, records, key-value pairs, or the like. For example, fields such as field 722 may include a list of records generated by one or more discovery agents during the pending investigation.

In general, for some embodiments, event data may be considered to be a data structure that represents the current state of the pending assessment of an event. In some embodiments, analysis agents or interview agents may add new fields or update the values of existing fields depending on the results of their respective evaluations.

In some embodiments, analysis engines may be arranged to distribute event data among two or more data structures rather than being limited to using a single data structure as shown here.

FIG. 8 illustrates a logical schematic of prompt 800 for incident driven automated investigation in accordance with one or more of the various embodiments. As described above, in some embodiments, analysis engines, interview engines, analysis agents, or interview agents may be arranged to determine prompt templates from among one or more prompt templates. In some embodiments, if a prompt template may be determined and one or more template parameter values may be provided prompts may be generated based on the prompt template and the parameter values. In some embodiments, the parameters may include a prompt query statement may vary depending on the particular prompt template or the purpose of the prompt. For example, as described herein, prompt templates or prompts for training models to discover users associated with events, evaluate if assessment findings may be eligible for interviews, generating interview questions, perform interviews, or the like.

Further, while for brevity and clarity the term prompt template is used to refer to data that has yet to be transform into an actual generative AI prompt, the innovations herein anticipate that in some embodiments analysis engines, interview engines, interview agents, or the like, may construct or otherwise generate prompts based on one or more partial templates used in combination, rules, instructions, code generators, or the like, that may generate the prompts.

One of ordinary skill in the art will appreciate that the particular contents or text included in prompt templates may vary depending on various factors, including, the generative AI system (e.g., different types/version/brands of generative AI systems may require different prompt templates), format or content required for desired responses, or the like. In general prompt templates may be developed experimentally such that analysis engines or interview engines may employ prompt templates to generate prompts that may be used to train generative AI systems to produce responses that conform to the requirements of the analysis engines or interview engines. In some embodiments, prompt templates may be included in a prompt template repository or other data store. In some cases, employing prompts to train a more generalized generative AI to provide particular results that the generative AI may not explicitly be trained or tuned for may be referred to as zero-shot learning because the generalized generative AI is trained by the prompts in real-time to provide the desired results. Accordingly, in some embodiments, generative AI systems that consume prompts may perform transfer learning, or the like, to provide specific results, such as, determining users associated with events, event findings that may be eligible for interviews, presenting interview questions to interviews, performing interviews, or the like.

Accordingly, in some embodiments, the particular contents of prompt templates or prompts may depend on the semantic understanding capabilities of the underlying generative AI. Thus, in some cases, different generative AI systems may require different prompt templates. Further, in some embodiments, different generative AI systems may be engineered to address different target audiences, subject matter, problem domains, or the like. Accordingly, in some embodiments, analysis engines or interview engines may be arranged to select among multiple generative AI systems depending on the queries, response targets, transaction costs, latency, or other considerations that may be relevant given the local circumstances or local requirements. Thus, in some embodiments, analysis engines or interview engines may be arranged to employ rules, instructions, restrictions, constraints for selecting generative AI systems based on configuration information.

In some embodiments, prompt templates may comprise a dataset container, such as, container 802 that may hold the contents for the prompt. Also, in some embodiments, prompt templates may be configured to include various sections, including, for example, context section 804, guide rule section 806, example section 808, query statement placeholder 810, termination section 812, or the like. In some cases, for some embodiments, prompt templates may omit one or more sections. Likewise, in some embodiments, prompt templates may include one or more other sections. Further, in some cases, prompt templates may arrange the various sections in a different order than shown here. Thus, in some embodiments, analysis engines or interview engines may be arranged to employ different prompt templates for different problems or different generative AI systems as needed based on rules or instructions provided via configuration information.

In one or more of the various embodiments, prompt containers may be variables, parameters, objects, data structures, or the like, that enable the prompts to be passed to a generative AI system. In some cases, for some embodiments, a prompt container may be a buffer of text characters that form a string collection that may be included in the prompts. Likewise, for example, a prompt container may be an object or class instance designed for handling the types of content (e.g., string, audio, or the like) included in a particular prompt.

In one or more of the various embodiments, context sections such as context section 804 may be portions of a prompt template that inject statements that establish a working context that may aid in the training of the generative AI system to generate results for analysis engines or interview engines. For example, in some embodiments, context sections may be employed to declare one or more features or characteristics associated with a particular analysis, assessment, or evaluation. Accordingly, in some embodiments, generative AI systems may incorporate this context information as part of the generative process for evaluating events, determining users associated with events, determining event findings that may benefit from interviews, presenting interview questions to interviews, or the like.

In one or more of the various embodiments, guide rule sections such as guide rule section 806 may be portions of a prompt template that include one or more statements that may be selected to provide additional guidance or direction (directives) for training the generative AI to generate the desired responses (e.g., interview questions). For example, in some embodiments, guide rules may include statements that declare rules for omitting certain types of punctuation, omitting in-depth explanation text from responses, directives to specifically or particularly take actions if certain words or text forms are encountered while generating results, or the like.

In one or more of the various embodiments, example sections such as example section 808 may be a portion of a prompt template that includes one or more examples of the information that may correspond to the example query statement. In some embodiments, if needed, the example information may guide the training of the generative AI system to generate results that conform to the requirements of the analysis engines or interview engines.

In one or more of the various embodiments, query statement placeholders such as query statement placeholder 810 may be specialized tokens, markers, mark-up, or the like, that indicate where in the prompt template that the actual query statement or other parameter values should be embedded in the prompt.

In one or more of the various embodiments, termination sections such as termination section 812 may be a portion of a prompt template that includes additional context information or guide rules that may be required to "close" the prompts. For example, for some embodiments, termination sections may include a text statement indicating the generative AI system should end the session, or the like. In some cases, termination sections may include directives to limit the size of responses.

In some embodiments, analysis engines or interview engines may be arranged to employ one or more prompt engineering frameworks that support key words, data definition languages, formatting, or the like, to enable parameterized prompt generation such that analysis engines or interview engines may be arranged to provide particular parameters or inputs that enable the prompt engineering framework to generate the actual prompts that may be provided to generative AI systems.

FIG. 9 illustrates prompt template 900 for incident driven automated investigation in accordance with one or more of the various embodiments. As described above, prompt templates may include one or more sections. Accordingly, for some embodiments, prompt template 900 represents a prompt template that interview engines may employ to generate discovery prompts that may be provided to train a generative AI discovery model to examine event data to identify users that may be candidates for interviews.

In this example, for some embodiments, section 902 includes text that establishes a working context that may influence the reasoning used by the generative AI to determine interview candidates.

Also, in this example, for some embodiments, section 904 includes additional context information.

Also, in this example, for some embodiments, section 906 includes the placeholder marker where event data may be included in the prompt. In this example, section 906 may be filled with a natural language expression of representation of the information included in the event data for the pending event investigation.

Also, in this example, for some embodiments, section 908 includes directives, rules, or guidelines for training generative AI discovery models to perform the requested task. In this example, the task may be assumed to be determining one or more users that may be interview candidates based on the current event data for the pending event assessment.

FIG. 10 illustrates prompt template 1000 for incident driven automated investigation in accordance with one or more of the various embodiments. As described above, prompt templates may include one or more sections. Accordingly, for some embodiments, prompt template 1000 represents a prompt template that interview engines may employ to generate subject prompts that may be provided to train a generative AI subject model to determine if interview questions may be recommended for findings associated with the event assessment/incident investigation. And, if findings may be determined to be eligible for interviews, the generative AI is directed to generate those interview questions.

In this example, for some embodiments, section 1002 includes text that establishes a working context that may influence the reasoning used by the generative AI to evaluate findings to determine if interviews should be recommended.

In this example, the context text is directing the generative AI to operate as if it was a network security AI assistant.

Also, in this example, for some embodiments, section 1004 includes text describing the general task for the generative AI.

Also, in this example, for some embodiments, section 1006 includes the placeholder marker where event data may be included in the prompt. In this example, section 1006 may be filled with a natural language expression of representation of the information included in the event data for the pending event assessment.

Also, in this example, for some embodiments, section 1008 includes guidelines for training the generative AI to perform the requested task. In this example, the task may be to evaluate the findings associated with the event to determine if they may be eligible for interviews questions.

Also, in this example, for some embodiments, section 1010 includes additional rules or guidelines for training the generative AI to perform the requested tasks. In this example, the task may be to evaluate the findings associated with the event assessment to determine if they may be eligible for interview questions. Also, in some embodiments, subject prompts may include additional rules or directives for determining questions or determining if findings may be a eligible for interviews.

FIG. 11 illustrates prompt template 1100 for incident driven automated investigation in accordance with one or more of the various embodiments. As described above, prompt templates may include one or more sections. Accordingly, for some embodiments, prompt template 1100 represents a prompt template that interview engines may employ to generate questioner prompts that may be provided to train a generative AI questioner model to perform interviews associated with the event/incident investigation.

In this example, for some embodiments, section 1102 includes text that establishes a working context that may influence the reasoning used by the questioner model to perform an interview to further the pending event/incident investigation. In this example, the context text is directing the questioner model to operate as if it was a network security AI assistant.

Also, in this example, for some embodiments, section 1104 includes text describing the general task for the questioner model.

Also, in this example, for some embodiments, section 1106 includes directives, rules, or guidelines for training the questioner model to perform the requested task. In this example, the prompt is configured to train the questioner model to perform an interview with a user associated with the event that is under investigation.

Also, in this example, for some embodiments, section 1108 may be considered a termination section that includes additional rules or guidelines for determining if the interview may be considered finished.

Also, in this example, for some embodiments, section 1110 includes the placeholder marker where event data may be included in the prompt. In this example, section 1110 may be filled with a natural language expression of the question being asked as well as the interviewee name which may be used in the communications to perform the interview.

Generalized Operations

FIGS. 12-16 represent generalized operations for incident driven automated investigation in accordance with one or more of the various embodiments. In one or more of the various embodiments, processes 1200, 1300, 1400, 1500, and 1600 described in conjunction with FIGS. 12-16 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environments. However, embodiments are not so limited and various combinations of network computers, client computers, or the like may be utilized. Further, in one or more of the various embodiments, the processes described in conjunction with FIGS. 12-16 may be used for incident driven automated investigation in accordance with at least one of the various embodiments or architectures such as those described in conjunction with FIGS. 1-11. Further, in one or more of the various embodiments, some or all of the actions performed by processes 1200, 1300, 1400, 1500 and 1600 may be executed in part by analysis engine 322, interview engine 324, interview agents 326, or the like, running on one or more processors of one or more network computers.

Figure 12:
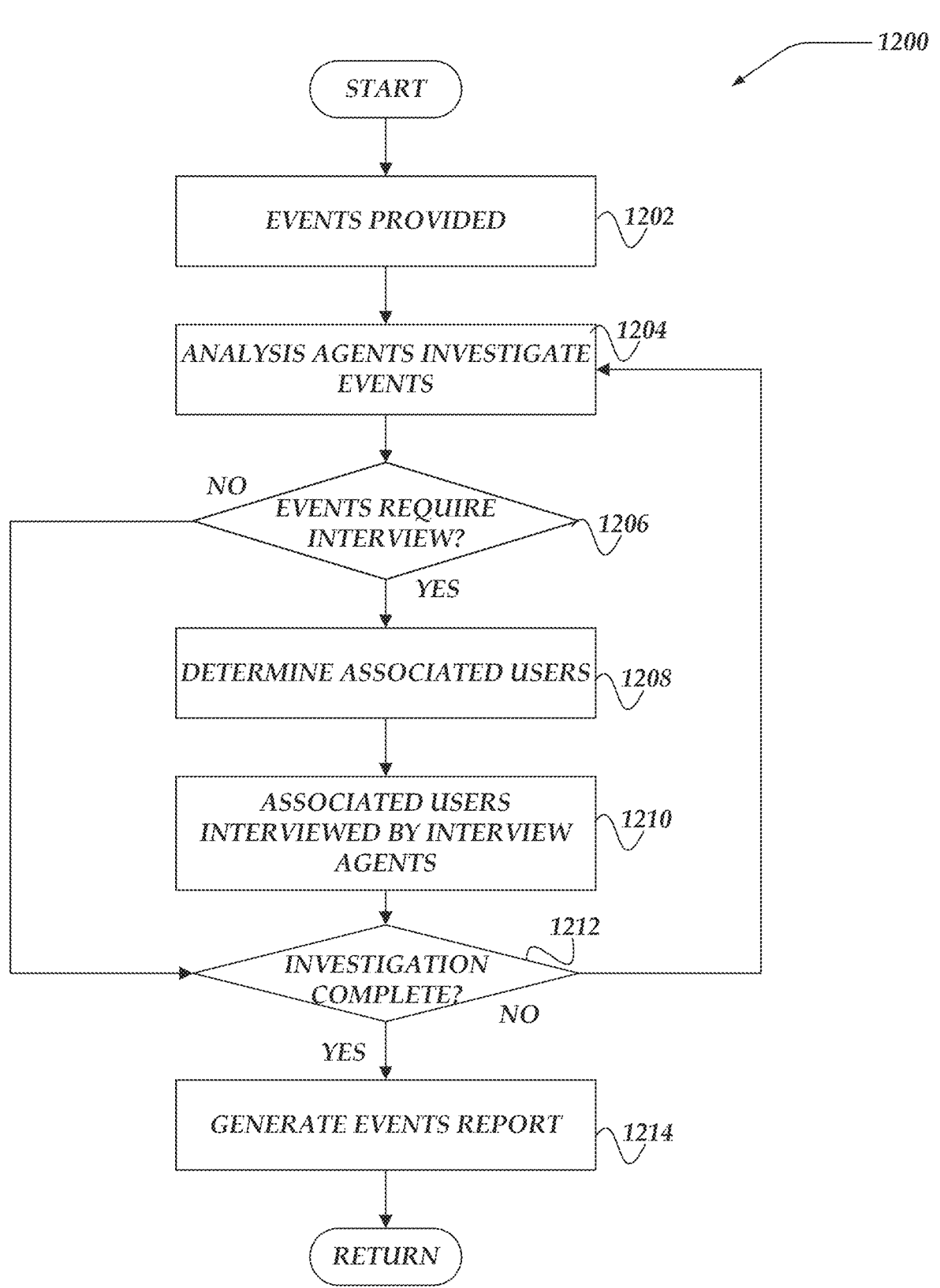
FIG. 12 illustrates an overview flowchart of a process for incident driven automated investigation in accordance with one or more of the various embodiments.

FIG. 12 illustrates an overview flowchart of process 1200 for incident driven automated investigation in accordance with one or more of the various embodiments. After a start block, at block 1202, in one or more of the various embodiments, one or more events may be provided to an analysis engine. As describe above, in some embodiments, events associated with network activity (e.g., events, messages, notifications, alerts, or the like) may be issued by various network monitoring services. Also, in some embodiments, events may be associated with other services beyond network security, such as events from various systems, including building management systems, physical security systems, HVAC systems, facility access management systems, or the like.

In some embodiments, analysis engines may be arranged to integrate with various services that may generate events. In some embodiments, events may be pushed automatically to analysis engines. Also, in some embodiments, events may be collected by polling one or more services.

At block 1204, in one or more of the various embodiments, analysis engines may be arranged to employ analysis agents to perform an assessment or investigation of the one or more events. In some embodiments, events may be provided with initial information, such as the text or contents of the events, meta-data associated with events, source of event, or the like. Accordingly, in some embodiments, analysis agents may be configured to perform automated investigations in an attempt to automatically assess, categorize, or characterize the events to determine if mitigation, remediation, or other interventions may be required. For example, in some embodiments, investigations by analysis agents may identify false positive events, over prioritized events, or the like.

In some embodiments, analysis engines may be arranged to employ one or more analysis agents to assess, evaluate, or characterize events. In some embodiments, investigations by initial analysis agents may determine one or more subsequent analysis agents that may be employed to further evaluate the events.

At decision block 1206, in one or more of the various embodiments, if events may require interviews, control may flow to block 1208; otherwise, control may flow decision block 1212.

In some embodiments, one or more analysis agents or the analysis engines may be arranged to determine if an event investigation may benefit from an interview with one or more associated users. Accordingly, in some embodiments, analysis engines or analysis agents may be configured to request an interview based on various criteria, including event type, event source, event priority, various event metrics (e.g., rate of events, time of day, day of week, or the like). Further, in some embodiments, additional characteristics such as associated resources, event source, associated users, or the like. For example, in some embodiments, analysis agents may be configured to determine that events associated with a critical system may be eligible for interviews. Also, in some embodiments, analysis engines or analysis agents may be configured to require interviews for unusual activity. Also, in some embodiments, analysis agents or analysis engines may be configured request interviews based on ad hoc or arbitrary policies rules that may be put in place for local circumstances or local requirements. For example, in some embodiments, an organization may have a policy the requires interviews of each person that accesses a particular resource rather than being limited to anomalies, security breaches, or the like.

In some embodiments, analysis agents may be arranged to update one or more data structures, such as event data that may collect the information discovered during the assessment of the events. In some embodiments, analysis agents may include an indicator in the event data that signals the analysis engine to perform an interview. In some embodiments, analysis engines may be arranged to attempt to perform interviews after automated investigations by the analysis agents have completed. However, in some embodiments, one or more analysis agents may be configured to wait for interviews to be completed before performing their analysis. For example, in some embodiments, assessments of events may be suspended while associated interviews may be pending.

At block 1208, in one or more of the various embodiments, interview engines may be arranged to determine one or more users that may be associated with the event. As described above, interview engines may be arranged to employ one or more interview agents to automate the interview process. As mentioned above, in some embodiments, interview agents may include various agents, such as discovery agents, subject agents, or questioner agents. In some embodiments, discovery agents may be arranged to determine if there may be one or more associated users that may be interviewed. In some embodiments, subject agents may be arranged to determine which investigation findings may benefit from interviews as well as the questions to ask for each finding that may be the subject of an interview. Finally, in some embodiments, questioner agents may be arranged to perform the interviews with one or more of the determined associated users, if any.

At block 1210, in one or more of the various embodiments, interview engines may be arranged to perform one or more interviews with the associated users. As described above, specialized interview agents, such as questioner agents may be arranged to perform the interviews. In some embodiments, questioner agents may be arranged to present the questions to the determined users using various communication methods.

At decision block 1212, in one or more of the various embodiments, if the investigation may be complete, control may flow to block 1214; otherwise, control may loop back to block 1204. In some cases, for some embodiments, interviews may be the last step to complete an investigation. However, in some embodiments, interviews may occur before the automated investigation may be complete. Further, in some embodiments, the responses to interview questions may in some cases trigger additional automated investigations by one or more analysis agents.

At block 1214, in one or more of the various embodiments, analysis engines may be arranged to generate an investigation report that is based the assessment of the event. In some embodiments, information collected during the interviews may be included in the event data along with other information collected by analysis agents. In some embodiments, interview engines (or analysis engines) may be arranged to generate interactive reports that include the information or conclusions determined from the interviews along with information associated with the overall investigation.

In some embodiments, rather than generate a report suitable for human consumption or interactions, interview engines or analysis engines may update one or more data stores or databases such that other applications or other services may employ the event data in their reports or displays.

Next, in one or more of the various embodiments, control may be returned to a calling process.

Figure 13:
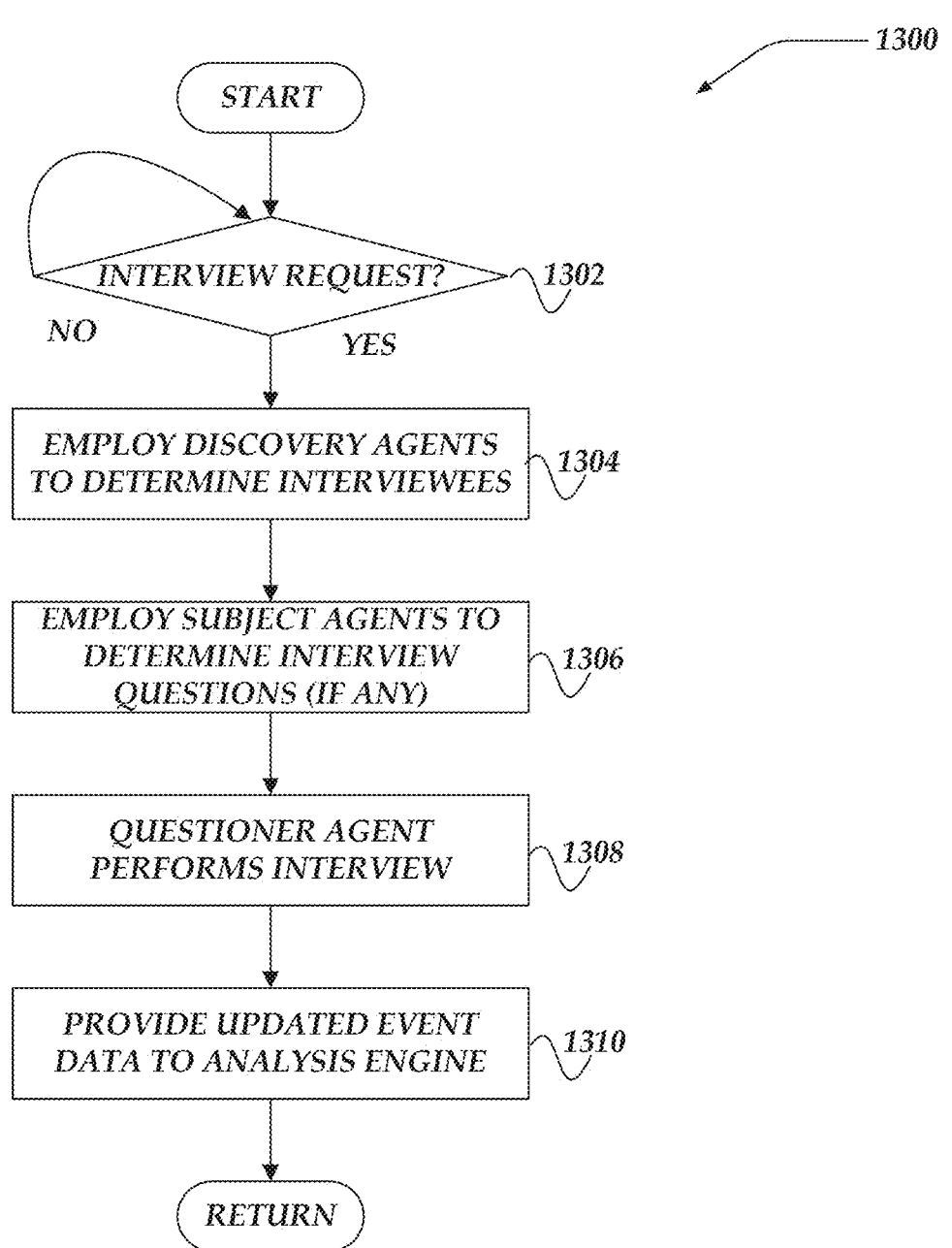
FIG. 13 illustrates a flowchart of a process for incident driven automated investigation in accordance with one or more of the various embodiments.

FIG. 13 illustrates a flowchart of process 1300 for incident driven automated investigation in accordance with one or more of the various embodiments. After a start block, at decision block 1302, in one or more of the various embodiments, if an interview may be requested, control may flow to block 1304; otherwise, control may loop back to decision block 1302. As described above, in some embodiments, analysis engines may be arranged to request or otherwise initiate an interview to determine information for incident driven automated investigation.

In some embodiments, analysis engines may be arranged to provide the current event data to interview engines to proceed with the interview process. Note, in some cases, for some embodiments, interview engines may be part of (e.g., components, libraries, modules, or the like) of analysis engines. Likewise, in some embodiments, one or more of the actions attributed to interview engines herein may be performed by analysis engines. However, for brevity or clarity, interview engines may be referred to herein as separate engines even though it may be part of or incorporated within analysis engines without departing from the scope of the innovations disclosed herein.

At block 1304, in one or more of the various embodiments, interview engines may be arranged to employ one or more discovery agents to determine one or more users to interview. In some embodiments, discovery agents may be configured to investigate the event or event data to determine one or more users that may be associated with events. In some embodiments, discovery agents may be configured to limit or shape the scope of which users may be considered eligible for interviews. For example, in some embodiments, for events associated with access of protected resources, discovery agents may be configured to limit the search for associated users, the user that is responsible for the access attempt. For example, in such cases, the event or event data may identify the user explicitly for events related to logins, door opening (e.g., badge access control), or the like.

In some embodiments, the associated users may not be explicitly declared in the event or event data. Accordingly, in some embodiments, discovery agents may be configured to examine the event, event data, or the like, to predict or infer the associated users. Also, in some embodiments, discovery agents may be arranged to determine alternative user identification methods for associated users. For example, if the event data includes a username of a user, discovery agents may be arranged to determine the user's email addresses, instance messaging username, telephone number, or the like that may be absent from the current event data. Accordingly, in some embodiments, discovery agents may be arranged to interface with an organization's directory services, or the like, to obtain alternative user identifiers for users associated with the events.

As described above, in some embodiments, discovery agents may be arranged to generate discovery prompts that may be used to train discovery models that may include generative AI systems to assist in the discovery of users that may be associated with the incident investigation.

At block 1306, in one or more of the various embodiments, interview engines may be arranged to employ one or more subject agents to determine one or more interview questions. As described above, in some embodiments, interview engines may be arranged to employ one or more subject agents to determine if various findings in the event data may be eligible or suitable for interviews.

Also, in some embodiments, if one or more findings may be determined to be eligible for interviews, subject agents may be arranged to generate one or more questions for the interview based on the findings or event data.

In some embodiments, subject agents may determine that none of the findings in the event are eligible for generating an interview. Accordingly, in some embodiments, interview engines may report the absence of eligible findings to the analysis engines that initiated the interview process.

At block 1308, in one or more of the various embodiments, interview engines may be arranged to employ one or more questioner agents to perform the interview. As described above, in some embodiments, interview engines may be arranged to employ interview agents, such as questioner agents to perform interviews. In some embodiments, interview agents may be arranged to communicate with the one or more users determined by the discovery agents. Accordingly, in some embodiments, questioner agents may be arranged to present the questions determined by subject agents to the one or more associated users to elicit responses.

Further, in some embodiments, questioner agents may be arranged to interact with interviewees by presenting the questions and one or more follow-up questions. In some embodiments, questioner agents may be arranged to employ various communication methods, such as email, instant messaging, text messages, voice calls, user interface notifications, or the like, to perform interviews.

In some embodiments, different questioner agents may be specialized for different communication methods. Accordingly, in some embodiments, specialized questioner agents may be configured for different communication methods. For example, in some embodiments, one questioner agent may be specialized for performing interviews over email while another questioner agent may be specialized for performing interviews using instant message applications. Note, in some embodiments, individual questioner agents may be arranged to communicate using more than one communication method rather than being limited to a single method.

In some embodiments, interview engines or questioner agents may be arranged to generate prompts for generative AI questioner models to guide the interview. In some embodiments, questioner models may be employed to determine the tone, context, or rules of engagement for the interview. Also, in some embodiments, questioner models may be employed to determine or monitor the conditions to terminating an interview.

In some embodiments, questioner agents may be configured to abandon an interview if certain conditions may be met. Also, in some embodiments, questioner agents may be configured to terminate interviews if the required/requested information has been provided. For example, a question may ask for a confirmation from the user that performed an action, thus in some cases, a yes or no response from an associated user may complete the interview. In other cases, in some embodiments, questioner agents may manage interactive chat sessions such that interviewees may ask clarifying questions of the questioner agent or vice versa.

Also, in some embodiments, interview engines may be configured to request approval from an administrator or security analyst before executing an interview or otherwise attempting to communicate with the one or more users that may be target of the interview. Accordingly, in some embodiments, analysis engines or interview engines may be arranged to generate user interfaces that enable one or more authorized users to review the proposed interviews along with the current assessment of the events. Thus, in some embodiments, if the proposed interviews may be approved, the interview engines may proceed with the interview. Alternatively, in some embodiments, if the proposed interviews may be declined or otherwise remain unapproved, the interview may not be performed.

At block 1310, in one or more of the various embodiments, interview engines may be arranged to provide updated event data to analysis engines. In some embodiments, interview agents (e.g., discovery agents, subject agents, questioner agents, or the like) may update the event data based on their evaluations or interview responses. Accordingly, in some embodiments, the updated information may be provided to the analysis engines for further actions such as report generation, notifications, remediation, or the like.

Next, in one or more of the various embodiments, control may be returned to a calling process.

Figure 14:
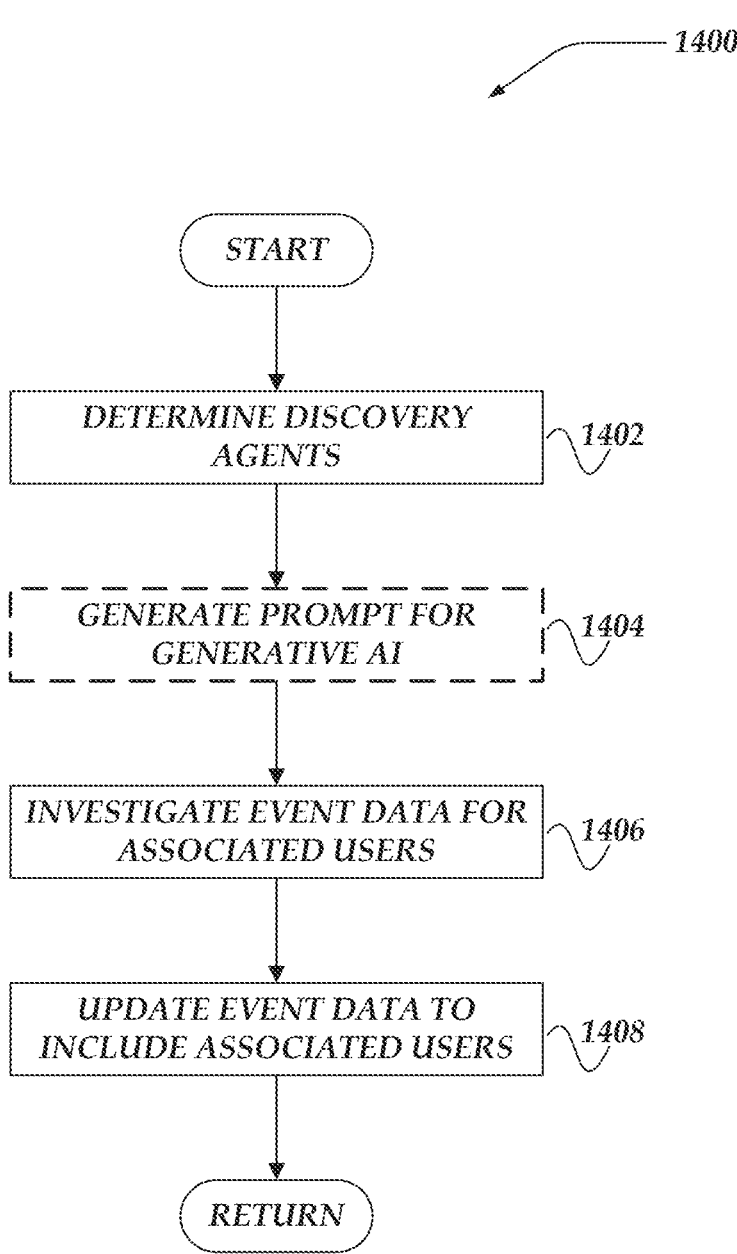
FIG. 14 illustrates a flowchart of a process for incident driven automated investigation in accordance with one or more of the various embodiments.

FIG. 14 illustrates a flowchart of process 1400 for incident driven automated investigation in accordance with one or more of the various embodiments. After a start block, at block 1302, in one or more of the various embodiments, interview engines may be arranged to determine one or more discovery agents for determining one or more users that may be associated with event under investigation.

In some embodiments, interview engines may be arranged to determine the particular discovery agents based on the event data or other configuration information. In some embodiments, two or more discovery agents may be determined such that a first discovery agent may be arranged to identify users while another discovery agent may be arranged to determine valid or alternative user identifiers. Or, in some embodiments, different discovery agents may be configured for investigating different types of event information for identifying users that may be associated events. For example, in some embodiments, a first discovery agent may be arranged to search email systems for users that may be associated with the event under investigation. Likewise, in some embodiments, a second discovery agent may be arranged to search for associated users by examining system logs, source control systems, chat logs, directory services, or the like.

In some embodiments, interview engines may be configured to select one or more discovery agents based on the event type or other information that may be present in the current event data.

At block 1404, in one or more of the various embodiments, optionally, interview engines may be arranged to generate one or more prompts for generative AI.

In some embodiments, discovery agents may be configured to employ discovery models that include or interface with one or more generative AI systems. Accordingly, in some embodiments, as described above, interview engines or discovery agents may be arranged to generate discovery prompts to train discovery models to determine users associated with the events being assessed.

In some embodiments, interview engines or discovery agents may be arranged to include context information such as emails associated with the event in discovery prompts. Likewise, in some embodiments, organizational information, such as employee directories, organization charts, telephone directories, room/office assignments, chat logs, or the like, may be included in discovery prompts as context information.

Further, in some embodiments, event data may include event information such as source network address, target network addresses, time information, day of week, associated application, or the like, in discovery prompts for training discovery models.

Note, this block is indicated as being optional because in some cases discovery agents may not employ generative AI systems.

At block 1406, in one or more of the various embodiments, interview engines may be arranged to determine one or more users associated with the event based on the event data.

In some embodiments, discovery agents may be arranged to include rules, instructions, filters, heuristics, machine-learning classifiers, or the like, to predict or infer the users that may be associated with the event under investigation. Further, in some embodiments, discovery agents may be arranged to submit one or more prompts to train generative AI to identify associated users. In some embodiments, one or more discovery agents or interview engines themselves may be arranged to validate the identified user information. For example, in some embodiments, if discovery agents produce email addresses of associated users, discovery agents or interview engines may be arranged to validate those email addresses by comparing them to information in directory services, address books, or the like. Accordingly, in some embodiments, user information that may not be validated may be omitted from the assessment. For example, in some embodiments, if a discovery agent recommends an email address and user's name, the interview engines may confirm that the determined user's name matches the email address as listed in a directory service user catalog. Also, in some embodiments, secondary evaluations may be employed to correct or validate user information. For example, in some embodiments, a prompt that included the initial set of associated user information may be resubmitted to the discovery model generative AI using another discovery prompt to confirm the user information. Similarly, in some embodiments, results of the discovery investigation may be compared with results produced by a different generative AI system. Accordingly, in some embodiments, mismatches may indicate that the discovery may have failed.

At block 1408, in one or more of the various embodiments, interview engines may be arranged to update the event data to include the users discovered by the discovery agents. In some embodiments, discovery agents may update the event data to include user information, such as email addresses, proper names, usernames, or the like, based on their investigations. Accordingly, in some embodiments, the updated event data may be provided to the interview engine.

In some embodiments, discovery agents may be configured to recommend or rank communication methods for reaching particular users or for gathering particular kinds information.

Next, in one or more of the various embodiments, control may be returned to a calling process.

Figure 15:
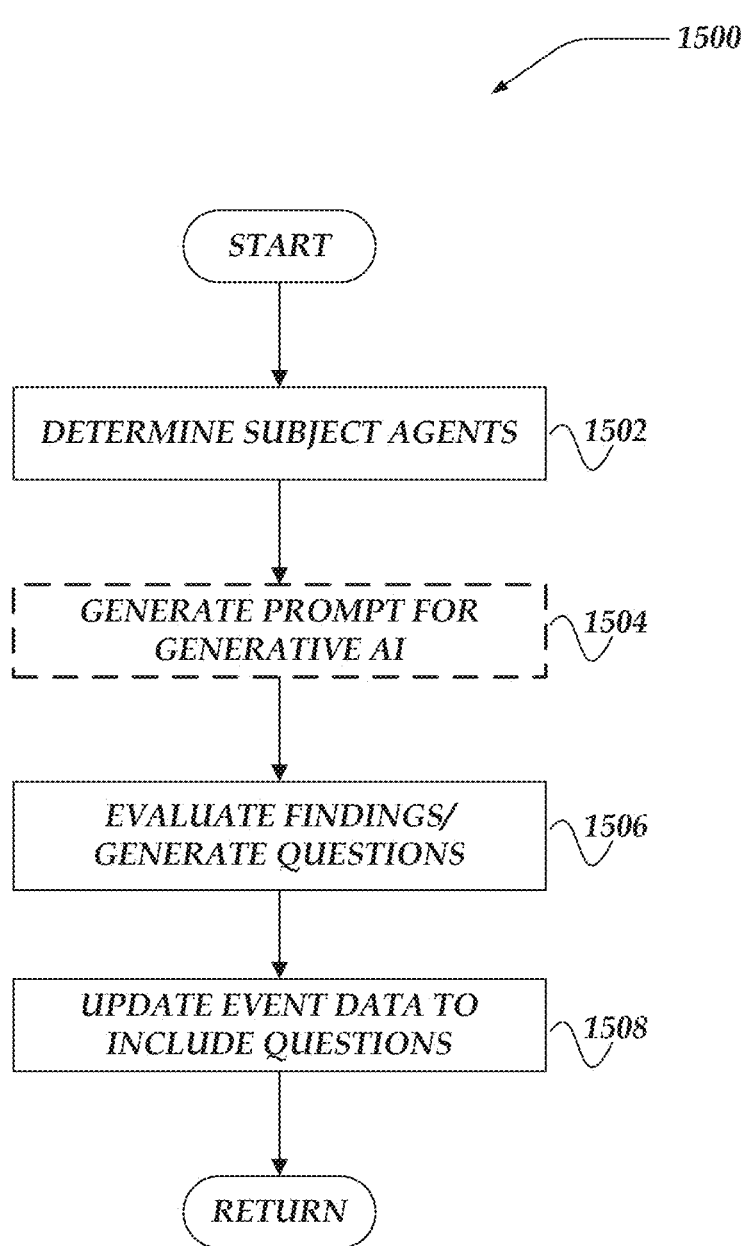
FIG. 15 illustrates a flowchart of a process for incident driven automated investigation in accordance with one or more of the various embodiments.

FIG. 15 illustrates a flowchart of process 1500 for incident driven automated investigation in accordance with one or more of the various embodiments. After a start block, at block 1502, in one or more of the various embodiments, interview engines may be arranged to determine one or more subject agents for evaluating assessment findings and determining one or more questions associated with the findings.

In some embodiments, subject agents may be arranged to evaluate current findings to determine if one or more findings may be eligible for interviews. In some embodiments, one or more subject agents may be specialized based on various event characteristics or incident characteristics. For example, for some embodiments, one or more subject agents may be associated with particular event types or other event characteristics such as geographic locations, licensing requirements, priority/criticality, affected/associated resources, or the like. In some cases, in some embodiments, characteristics of users associated with the event discovered by discovery agents may influence which subject agents may be determined. For example, in some embodiments, particular subject agents may be associated with users having particular roles or responsibilities.

At block 1504, in one or more of the various embodiments, optionally, subject engines may be arranged to generate one or more prompts for subject models that include or interface with generative AIs. Similar to discovery agents as described above, in some embodiments, subject agents may be configured to generate generative AI subject prompts or be provided subject prompts generated by interview engines. In some embodiments, subject prompts may be configured to train generative AI to evaluate investigation findings to determine if particular findings may be eligible or suitable for interviews. Also, in some embodiments, prompts for subject agents may be configured to train generative AI systems to predict effective interview questions.

In some embodiments, interview engines or subject agents may generate subject prompts that include the event data as context information. Also, in some embodiments, if available a text summary of the status or conclusion of the assessment of the event may be included in the subject prompt to provide additional context or guidance to a generative AI.

In some embodiments, subject prompts may be configured to train generative AI subject models to predict or infer how important an interview may be for a given interview request. Accordingly, in some embodiments, analysis engines or interview engines may be arranged to selectively perform interviews based on how important the interview may be considered for the current investigation. For example, in some embodiments, subject agents may determine that the information expected to be collected from the interview may be available in the current event data or from other sources besides an interview. For example, in some embodiments, information independently determined by two or more analysis agents may in combination answer questions that would otherwise be the subject of interviews. Further, in some embodiments, subject agents may be configured to evaluate if the putative interview questions may be answered from email archives, log files, or other data sources that do not require interacting with users.

Accordingly, in some embodiments, interview engines may be arranged to cancel interviews if it appears that the information sought by interviews may be obtained from other sources because of an absence of eligible findings.

Note, this block is indicated as being optional because in some cases subject agents may employ generative AI systems.

At block 1506, in one or more of the various embodiments, interview engines may be arranged to evaluate one or more findings. In some embodiments, if findings eligible for interviews may be determined, subject agents may be arranged to generate one or more questions associated with the eligible findings.

In some embodiments, subject agents may be arranged to include rules, instructions, filters, heuristics, machine-learning classifiers, or the like, to predict or infer if interviews may be suitable for one or more findings of the current investigations. Further, in some embodiments, subject agents may be arranged to submit one or more subject prompts to generative AI subject models to evaluate if findings may be improved by interviews or otherwise eligible for interviews. Also, in some embodiments, subject agents may be arranged to submit one or more subject prompts to generative AI subject model to formulate the particular questions used to perform interviews.

Also, in some embodiments, subject agents may determine that an interview may be canceled. For example, in some embodiments, if none of the current finding are determined to be eligible for interviews, subject agents or interview engines may be configured cancel the interview.

Note, as mentioned previously, in some cases, for some embodiments, analysis engines or interview engines may be configured such that one or more particular events may always require an interview. Also, in some embodiments, analysis engines or interview engines may be configured to use predefined questions for particular events or event types. Also, in some embodiments, one or more predefined questions may be configured to always be provided with an interview. For example, for some embodiments, interview engines may be configured lead interviews with questions that enable interviewees to confirm their identity or location before engaging with other generated questions.

At block 1508, in one or more of the various embodiments, interview engines may be arranged to update the event data to include the findings evaluations or questions.

In some embodiments, each subject agent may be arranged to include their determinations in the event data so it may be available to interview engines, analysis engines, questioner agents, or other interview agents. Accordingly, in some embodiments, the finding deemed eligible for interviews may be included in list or other data structures along with their associated questions. Also, in some embodiments, other meta-data such as importance of the interview to the pending event investigation or incident investigation.

Next, in one or more of the various embodiments, control may be returned to a calling process.

Figure 16:
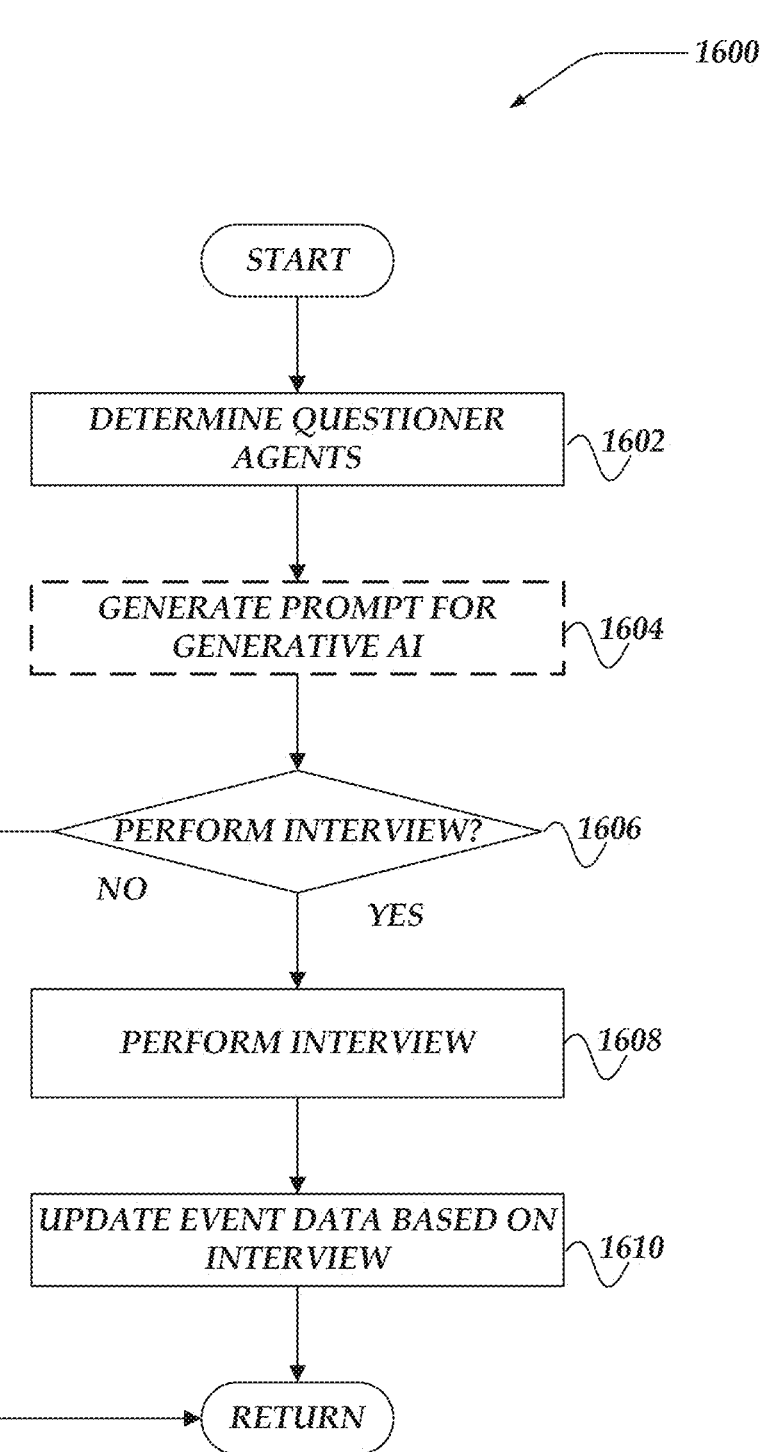
FIG. 16 illustrates a flowchart of a process for incident driven automated investigation in accordance with one or more of the various embodiments.

FIG. 16 illustrates a flowchart of process 1600 for incident driven automated investigation in accordance with one or more of the various embodiments. After a start block, at block 1602, in one or more of the various embodiments, interview engines may be arranged to determine one or more questioner agents for performing interviews.

In some embodiments, questioner agents may be arranged to interact with users using various communication methods. In some embodiments, one or more questioner agents may be specialized for particular communication methods. In some embodiments, interview engines or questioner agents may be arranged to select one or more other questioner agents subsequent to the operations of a previous questioner agent. For example, in some embodiments, a first questioner agent may be employed to determine the particular interview method and select a second questioner agent to perform the interview based on the determined method of communication.

At block 1604, in one or more of the various embodiments, optionally, questioner agents may be arranged to generate one or more questioner prompts for generative AI questioner models.

Similar to discovery agents as described above, in some embodiments, questioner agents may be configured to generate generative AI questioner prompts or be provided questioner prompts generated by interview engines. In some embodiments, questioner prompts may be configured to train generative AI to perform interviews based on the questions determined by the subject agents. Also, in some embodiments, prompts for questioner agents may be configured to train generative AI systems to determine if an interview has been completed.

In some embodiments, interview engines or questioner agents may generate questioner prompts that include the various portions of the event data as context information.

Note, this block is indicated as being optional because in some cases questioner agents may not employ generative AI systems.

At decision block 1606, in one or more of the various embodiments, if the interview may be performed, control may flow to block 1608; otherwise, control may be returned to a calling process.

In some embodiments, interview engines may be configured to require additional approval before executing an interview. In some embodiments, this may include generating interview requests that includes the proposed interview questions, or the like, to enable administrative users to approve or decline interview requests.

Also, in some embodiments, interview engines may be arranged to generate a questioner prompt that includes the event data with interview questions along with directives that may train a generative AI questioner model to give a recommendation if the interview should be performed. In some embodiments, interview engines may be arranged to generate a recommendation score. Accordingly, in some embodiments, if the recommendation score exceeds a configured threshold value, the interview may be recommended to proceed. While, if the recommendation score falls below the threshold value, the interview may be suspended, canceled, or deferred. In some embodiments, interview engines may be arranged to provide user interfaces that enable administrative users to override interview engines such that interviews may proceed even if they may be recommended against.

In some cases, in some embodiments, the recommendation score may be based on the entire state of the investigation and may be provided as a recommendation that administrative users may employ in their decision making process.

Accordingly, in some embodiments, interview engines may be configured to enable the interviews to be suspended, canceled, or deferred automatically or by administrative actions.

At block 1608, in one or more of the various embodiments, interview engines may be arranged to perform interviews of one or more users associated with the event being investigated. As described above, in some embodiments, discovery agents may have been employed to determine the one or more users that may be associated with the event under investigation.

Accordingly, in some embodiments, questioner agents may be arranged to communicate the one or more questions along with a summary of the findings to the one or more users to elicit response that include additional information for assessing events. In some embodiments, the interview may be interactive such that the questioner agent may provide follow-up questions in response to user's responses to obtain clarifications or confirmations. For example, in some embodiments, if a question asks for three items of information but the user provides just two items, the questioner agent may automatically generate another question to collect the missing item.

Likewise, in some embodiments, questioner agents may be arranged to confirm or validate particular types of information provided by interviewees. For example, if the user may be asked to provide their email address or telephone number, questioner agents may be configured validate the answers using directory services, user/employee catalogs, phone lists, or the like. Accordingly, in some embodiments, if a user response may be invalidated, questioner agents may be configured to ask a follow-up question to correct or clarify the invalid responses.

Also, in some embodiments, questioner agents may be arranged to offload one or more portions of the interview to other services, such as AI driven chat bots, or the like. Thus, in some embodiments, the other services may perform the interview and return the collected items to the questioner agent for validations or evaluation.

Accordingly, in some embodiments, questioner agents may be configured collect user answers and process them which may lead to other questions. In some embodiments, if the questioner agent determines that the conditions for determining that the interview may be completed may be met, the questioner agent may end the interview.

At block 1610, in one or more of the various embodiments, interview engines may be arranged to update the event data to include the information collected during the interview.

Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of these innovations.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of these innovations.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for monitoring security environments in a computing environment using one or more processors to execute instructions that are configured to cause actions, comprising:

using an analytic agent to obtain an assessment based on an investigation of one or more events associated with activity in the computing environment, wherein the assessment is used to generate event data that includes a plurality of findings associated with the investigation of the one or more events;

collecting one or more artifacts associated with the event based on information included in the event, wherein the one or more artifacts include one or more of a network address, a hostname, an email address, a username, an application, or a timestamp; and using the event data to cause further actions, including:

using a discovery agent to collect one or more users associated with an event based on the event data, wherein the discovery agent generates a discovery prompt to train one or more discovery models to identify one or more of a user or a candidate user to interview about the activity based on one or more event metrics and the event data that is updated to include one or more identifiers associated with the one or more of the user or the candidate user, wherein the event metrics include one or more of a rate, a size, a type, or a scope of the one or more events;

using a subject agent to collect one or more of the plurality of findings that are eligible for an interview based on the event and the updated event data, wherein the collection by the subject agent generates a subject prompt to train one or more subject models to determine eligibility of the one or more findings based on the updated event data;

using the subject agent to retrain the one or more subject models to collect a plurality of questions based on the one or more eligible findings and the updated event data, wherein each question requests additional information associated with the one or more eligible findings, and wherein the analysis agent determines one or more answers for one or more portions of the plurality of questions;

collecting one or more mandatory questions based on one or more characteristics of the event, wherein the one or more characteristics include one or more of an event type, an event priority, an event source, an event target, or a time-of-day, a geographic location, wherein the one or more mandatory questions are included in the interview;

using one or more other portions of the plurality of questions that are unanswered by the analysis agent to obtain an interactive interface, wherein the interactive user interface presents the one or more eligible findings and the one or more unanswered questions in a web page with one or more fields to collect one or more responses from the one or more of the user or candidate user that is also related to the one or more eligible findings;

using the one or more responses to iteratively collect one or more new questions that request new information that is related to the one or more eligible findings, wherein the collection of the new information continues until either one or more sources are identified for the one or more events or completion of one or more conditions causes abandonment of the interview;

using a questioner agent to collect the additional information and the new information for the one or more eligible findings based on each response from the one or more of the user or the candidate user to the one or more questions and the one or more new questions that are collected in the interactive user interface;

employing the questioner agent to generate a questioner prompt to train one or more questioner models to perform an interview using the one or more unanswered questions, the one or more new questions and context in the interactive user interface to elicit the additional information and the new information from the one or more of the user or the candidate user, wherein the questioner agent evaluates the one or more responses by the one or more of the user or the candidate user in the interview, wherein questioner agent automatically terminates the interview based on one or more of uncooperativeness, lack of knowledge, or an incorrect response to the one or more new and unanswered questions; and updating the assessment of the one or more events based on the additional information and the new information; and using the updated assessment to display a report for one or more security administrators associated with the computing environment.

2. The method of claim 1, further comprising:

collecting one or more artifacts associated with the event based on information included in the event, wherein the one or more artifacts include one or more of a network address, a hostname, an email address, a username, an application, or a timestamp; collecting one or more constraints based on one or more of a policy or the event data, wherein the one or more constraints include one or more of a type of user identifier to acknowledge or a user identifier to ignore; and obtaining the discovery prompt based on the one or more artifacts and the one or more constraints.

3. The method of claim 1, further comprising:

using a large language model to generate a natural language summary of the event based on the updated event data;

collecting one or more constraints associated with the one or more questions based on one or more of a policy or the updated event data, wherein the one or more constraints include one or more of a date range, or a subject to ignore; and including the event summary and the one or more constraints in the subject prompt.

4. The method of claim 1, further comprising:

collecting one or more directives based on one or more of a policy or the updated event data, wherein the one or more directives include one or more of a directive to include statements in the interview that convey a conversational tone, a directive to encourage a user to submit evidence or supporting documents, a directive to provide context associated with each question, or a directive to omit follow up questions that exceed a scope of a question; and including the interview directives in the questioner prompt.

5. The method of claim 1, wherein collecting the additional information for the one or more eligible findings, further comprises:

collecting one or more communication methods for performing the interview based on one or more of a policy, a user preference, an event type, or an event priority, wherein the one or more communication methods include one or more of an instant message, an email, a short message service message, a rich communication services message, a dialog box, a web form, or a push notification; and collecting one or more other communication methods based on a lack of response from the one or more users, wherein the one or more other communication methods are determined based on an escalation policy.

6. The method of claim 1, wherein performing the interview with the one or more users, further comprises:

obtaining the one or more questions using one or more natural language interrogative statements based on the one or more eligible findings, wherein a subject associated with the one or more questions is based on one or more facts that provide evidence to support the one or more eligible findings.

7. The method of claim 1, further comprising:

suspending the assessment of the one or more events based on a pending interview until the additional information is collected.

8. A network computer for monitoring security environments in a computing environment, comprising:

a memory that stores at least instructions; and one or more processors that execute instructions that are configured to cause actions, including:

using an analytic agent to obtain an assessment based on an investigation of one or more events associated with activity in the computing environment, wherein the assessment is used to generate event data that includes a plurality of findings associated with the investigation of the one or more events;

collecting one or more artifacts associated with the event based on information included in the event, wherein the one or more artifacts include one or more of a network address, a hostname, an email address, a username, an application, or a timestamp; and using the event data to cause further actions, including:

using a discovery agent to collect one or more users associated with an event based on the event data, wherein the discovery agent generates a discovery prompt to train one or more discovery models to identify one or more of a user or a candidate user to interview about the activity based on one or more event metrics and the event data that is updated to include one or more identifiers associated with the one or more of the user or the candidate user, wherein the event metrics include one or more of a rate, a size, a type, or a scope of the one or more events;

using a subject agent to collect one or more of the plurality of findings that are eligible for an interview based on the event and the updated event data, wherein the collection by the subject agent generates a subject prompt to train one or more subject models to determine eligibility of the one or more findings based on the updated event data;

using the subject agent to retrain the one or more subject models to collect a plurality of questions based on the one or more eligible findings and the updated event data, wherein each question requests additional information associated with the one or more eligible findings, and wherein the analysis agent determines one or more answers for one or more portions of the plurality of questions;

collecting one or more mandatory questions based on one or more characteristics of the event, wherein the one or more characteristics include one or more of an event type, an event priority, an event source, an event target, or a time-of-day, a geographic location, wherein the one or more mandatory questions are included in the interview;

using one or more other portions of the plurality of questions that are unanswered by the analysis agent to obtain an interactive interface, wherein the interactive user interface presents the one or more eligible findings and the one or more unanswered questions in a web page with one or more fields to collect one or more responses from the one or more of the user or candidate user that is also related to the one or more eligible findings;

using the one or more responses to iteratively collect one or more new questions that request new information that is related to the one or more eligible findings, wherein the collection of the new information continues until either one or more sources are identified for the one or more events or completion of one or more conditions causes abandonment of the interview;

using a questioner agent to collect the additional information and the new information for the one or more eligible findings based on each response from the one or more of the user or the candidate user to the one or more questions and the one or more new questions that are collected in the interactive user interface;

employing the questioner agent to generate a questioner prompt to train one or more questioner models to perform an interview using the one or more unanswered questions, the one or more new questions and context in the interactive user interface to elicit the additional information and the new information from the one or more of the user or the candidate user, wherein the questioner agent evaluates the one or more responses by the one or more of the user or the candidate user in the interview, wherein questioner agent automatically terminates the interview based on one or more of uncooperativeness, lack of knowledge, or an incorrect response to the one or more new and unanswered questions; and updating the assessment of the one or more events based on the additional information and the new information; and using the updated assessment to display a report for one or more security administrators associated with the computing environment.

9. The network computer of claim 8, further comprising:

collecting one or more artifacts associated with the event based on information included in the event, wherein the one or more artifacts include one or more of a network address, a hostname, an email address, a username, an application, or a timestamp; collecting one or more constraints based on one or more of a policy or the event data, wherein the one or more constraints include one or more of a type of user identifier to acknowledge or a user identifier to ignore; and obtaining the discovery prompt based on the one or more artifacts and the one or more constraints.

10. The network computer of claim 8, further comprising:

using a large language model to generate a natural language summary of the event based on the updated event data;

collecting one or more constraints associated with the one or more questions based on one or more of a policy or the updated event data, wherein the one or more constraints include one or more of a date range, or a subject to ignore; and including the event summary and the one or more constraints in the subject prompt.

11. The network computer of claim 8, further comprising:

collecting one or more directives based on one or more of a policy or the updated event data, wherein the one or more directives include one or more of a directive to include statements in the interview that convey a conversational tone, a directive to encourage a user to submit evidence or supporting documents, a directive to provide context associated with each question, or a directive to omit follow up questions that exceed a scope of a question; and including the interview directives in the questioner prompt.

12. The network computer of claim 8, wherein collecting the additional information for the one or more eligible findings, further comprises:

collecting one or more communication methods for performing the interview based on one or more of a policy, a user preference, an event type, or an event priority, wherein the one or more communication methods include one or more of an instant message, an email, a short message service message, a rich communication services message, a dialog box, a web form, or a push notification; and collecting one or more other communication methods based on a lack of response from the one or more users, wherein the one or more other communication methods are determined based on an escalation policy.

13. The network computer of claim 8, wherein performing the interview with the one or more users, further comprises:

obtaining the one or more questions using one or more natural language interrogative statements based on the one or more eligible findings, wherein a subject associated with the one or more questions is based on one or more facts that provide evidence to support the one or more eligible findings.

14. The network computer of claim 8, further comprising:

suspending the assessment of the one or more events based on a pending interview until the additional information is collected.

15. A processor readable non-transitory storage media that includes instructions configured for monitoring security environments in a computing environment, wherein execution of the instructions by one or more processors on one or more network computers performs actions, comprising:

using an analytic agent to obtain an assessment based on an investigation of one or more events associated with activity in the computing environment, wherein the assessment is used to generate event data that includes a plurality of findings associated with the investigation of the one or more events;

collecting one or more artifacts associated with the event based on information included in the event, wherein the one or more artifacts include one or more of a network address, a hostname, an email address, a username, an application, or a timestamp; and using the event data to cause further actions, including:

using a discovery agent to collect one or more users associated with an event based on the event data, wherein the discovery agent generates a discovery prompt to train one or more discovery models to identify one or more of a user or a candidate user to interview about the activity based on one or more event metrics and the event data that is updated to include one or more identifiers associated with the one or more of the user or the candidate user, wherein the event metrics include one or more of a rate, a size, a type, or a scope of the one or more events;

using a subject agent to collect one or more of the plurality of findings that are eligible for an interview based on the event and the updated event data, wherein the collection by the subject agent generates a subject prompt to train one or more subject models to determine eligibility of the one or more findings based on the updated event data;

using the subject agent to retrain the one or more subject models to collect a plurality of questions based on the one or more eligible findings and the updated event data, wherein each question requests additional information associated with the one or more eligible findings, and wherein the analysis agent determines one or more answers for one or more portions of the plurality of questions;

collecting one or more mandatory questions based on one or more characteristics of the event, wherein the one or more characteristics include one or more of an event type, an event priority, an event source, an event target, or a time-of-day, a geographic location, where in the one or more mandatory questions are included in the interview;

using one or more other portions of the plurality of questions that are unanswered by the analysis agent to obtain an interactive interface, wherein the interactive user interface presents the one or more eligible findings and the one or more unanswered questions in a web page with one or more fields to collect one or more responses from the one or more of the user or candidate user that is also related to the one or more eligible findings;

using the one or more responses to iteratively collect one or more new questions that request new information that is related to the one or more eligible findings, wherein the collection of the new information continues until either one or more sources are identified for the one or more events or completion of one or more conditions causes abandonment of the interview;

using a questioner agent to collect the additional information and the new information for the one or more eligible findings based on each response from the one or more of the user or the candidate user to the one or more questions and the one or more new questions that are collected in the interactive user interface;

employing the questioner agent to generate a questioner prompt to train one or more questioner models to perform an interview using the one or more unanswered questions, the one or more new questions and context in the interactive user interface to elicit the additional information and the new information from the one or more of the user or the candidate user, wherein the questioner agent evaluates the one or more responses by the one or more of the user or the candidate user in the interview, wherein questioner agent automatically terminates the interview based on one or more of uncooperativeness, lack of knowledge, or an incorrect response to the one or more new and unanswered questions; and updating the assessment of the one or more events based on the additional information and the new information; and using the updated assessment to display a report for one or more security administrators associated with the computing environment.

16. The media of claim 15, further comprising:

collecting one or more artifacts associated with the event based on information included in the event, wherein the one or more artifacts include one or more of a network address, a hostname, an email address, a username, an application, or a timestamp; collecting one or more constraints based on one or more of a policy or the event data, wherein the one or more constraints include one or more of a type of user identifier to acknowledge or a user identifier to ignore; and obtaining the discovery prompt based on the one or more artifacts and the one or more constraints.

17. The media of claim 15, further comprising:

using a large language model to generate a natural language summary of the event based on the updated event data;

collecting one or more constraints associated with the one or more questions based on one or more of a policy or the updated event data, wherein the one or more constraints include one or more of a date range, or a subject to ignore; and including the event summary and the one or more constraints in the subject prompt.

18. The media of claim 15, further comprising:

collecting one or more directives based on one or more of a policy or the updated event data, wherein the one or more directives include one or more of a directive to include statements in the interview that convey a conversational tone, a directive to encourage a user to submit evidence or supporting documents, a directive to provide context associated with each question, or a directive to omit follow up questions that exceed a scope of a question; and including the interview directives in the questioner prompt.

19. The media of claim 15, wherein collecting the additional information for the one or more eligible findings, further comprises:

collecting one or more communication methods for performing the interview based on one or more of a policy, a user preference, an event type, or an event priority, wherein the one or more communication methods include one or more of an instant message, an email, a short message service message, a rich communication services message, a dialog box, a web form, or a push notification; and collecting one or more other communication methods based on a lack of response from the one or more users, wherein the one or more other communication methods are determined based on an escalation policy.

20. The media of claim 15, wherein performing the interview with the one or more users, further comprises:

obtaining the one or more questions using one or more natural language interrogative statements based on the one or more eligible findings, wherein a subject associated with the one or more questions is based on one or more facts that provide evidence to support the one or more eligible findings.

21. A system for monitoring security environments in a computing environment, comprising:

a network computer, comprising:

a memory that stores at least instructions; and one or more processors that execute instructions that are configured to cause performance of actions, including:

using an analytic agent to obtain an assessment based on an investigation of one or more events associated with activity in the computing environment, wherein the assessment is used to generate event data that includes a plurality of findings associated with the investigation of the one or more events;

collecting one or more artifacts associated with the event based on information included in the event, wherein the one or more artifacts include one or more of a network address, a hostname, an email address, a username, an application, or a timestamp; and using the event data to cause further actions, including:

using a discovery agent to collect one or more users associated with an event based on the event data, wherein the discovery agent generates a discovery prompt to train one or more discovery models to identify one or more of a user or a candidate user to interview about the activity based on one or more event metrics and the event data that is updated to include one or more identifiers associated with the one or more of the user or the candidate user, wherein the event metrics include one or more of a rate, a size, a type, or a scope of the one or more events;

using a subject agent to collect one or more of the plurality of findings that are eligible for an interview based on the event and the updated event data, wherein the collection by the subject agent generates a subject prompt to train one or more subject models to determine eligibility of the one or more findings based on the updated event data;

using the subject agent to retrain the one or more subject models to collect a plurality of questions based on the one or more eligible findings and the updated event data, wherein each question requests additional information associated with the one or more eligible findings, and wherein the analysis agent determines one or more answers for one or more portions of the plurality of questions;

collecting one or more mandatory questions based on one or more characteristics of the event, wherein the one or more characteristics include one or more of an event type, an event priority, an event source, an event target, or a time-of-day, a geographic location, wherein the one or more mandatory questions are included in the interview;

using one or more other portions of the plurality of questions that are unanswered by the analysis agent to obtain an interactive interface, wherein the interactive user interface presents the one or more eligible findings and the one or more unanswered questions in a web page with one or more fields to collect one or more responses from the one or more of the user or candidate user that is also related to the one or more eligible findings;

using the one or more responses to iteratively collect one or more new questions that request new information that is related to the one or more eligible findings, wherein the collection of the new information continues until either one or more sources are identified for the one or more events or completion of one or more conditions causes abandonment of the interview;

using a questioner agent to collect the additional information and the new information for the one or more eligible findings based on each response from the one or more of the user or the candidate user to the one or more questions and the one or more new questions that are collected in the interactive user interface;

employing the questioner agent to generate a questioner prompt to train one or more questioner models to perform an interview using the one or more unanswered questions, the one or more new questions and context in the interactive user interface to elicit the additional information and the new information from the one or more of the user or the candidate user, wherein the questioner agent evaluates the one or more responses by the one or more of the user or the candidate user in the interview, wherein questioner agent automatically terminates the interview based on one or more of uncooperativeness, lack of knowledge, or an incorrect response to the one or more new and unanswered questions; and updating the assessment of the one or more events based on the additional information and the new information; and using the updated assessment to display a report for one or more security administrators associated with the computing environment; and a client computer, comprising:

a memory that stores at least instructions; and one or more processors that execute instructions that are configured to cause performance of other actions, including:

displaying a presentation of the one or more questions and the one or more new questions in the interactive user interface to the one or more users.

22. The system of claim 21, further comprising:

collecting one or more artifacts associated with the event based on information included in the event, wherein the one or more artifacts include one or more of a network address, a hostname, an email address, a username, an application, or a timestamp; collecting one or more constraints based on one or more of a policy or the event data, wherein the one or more constraints include one or more of a type of user identifier to acknowledge or a user identifier to ignore; and obtaining the discovery prompt based on the one or more artifacts and the one or more constraints.

23. The system of claim 21, further comprising:

using a large language model to generate a natural language summary of the event based on the updated event data;

collecting one or more constraints associated with the one or more questions based on one or more of a policy or the updated event data, wherein the one or more constraints include one or more of a date range, or a subject to ignore; and including the event summary and the one or more constraints in the subject prompt.

24. The system of claim 21, further comprising:

collecting one or more directives based on one or more of a policy or the updated event data, wherein the one or more directives include one or more of a directive to include statements in the interview that convey a conversational tone, a directive to encourage a user to submit evidence or supporting documents, a directive to provide context associated with each question, or a directive to omit follow up questions that exceed a scope of a question; and including the interview directives in the questioner prompt.

25. The system of claim 21, wherein collecting the additional information for the one or more eligible findings, further comprises:

collecting one or more communication methods for performing the interview based on one or more of a policy, a user preference, an event type, or an event priority, wherein the one or more communication methods include one or more of an instant message, an email, a short message service message, a rich communication services message, a dialog box, a web form, or a push notification; and collecting one or more other communication methods based on a lack of response from the one or more users, wherein the one or more other communication methods are determined based on an escalation policy.

26. The system of claim 21, wherein performing the interview with the one or more users, further comprises:

obtaining the one or more questions using one or more natural language interrogative statements based on the one or more eligible findings, wherein a subject associated with the one or more questions is based on one or more facts that provide evidence to support the one or more eligible findings.

\* \* \* \* \*